United States Patent
Nasir et al.

(10) Patent No.: US 9,307,089 B2
(45) Date of Patent: Apr. 5, 2016

(54) CONFERENCE CALL SYSTEMS AND METHODS

(71) Applicant: Verizon Patent and Licensing Inc., Arlington, VA (US)

(72) Inventors: Azim Nasir, Foxboro, MA (US); Andre R. Turner, Belmont, MA (US); Dongchen Wang, Concord, MA (US); Hong Xiao, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/470,739

(22) Filed: Aug. 27, 2014

(65) Prior Publication Data

US 2016/0065742 A1    Mar. 3, 2016

(51) Int. Cl.
*H04M 3/56*    (2006.01)

(52) U.S. Cl.
CPC ............. *H04M 3/563* (2013.01); *H04M 3/56* (2013.01); *H04M 3/568* (2013.01)

(58) Field of Classification Search
USPC ............ 455/416; 379/202.01, 93.21, 158, 93, 379/23; 348/14.08; 370/260, 261
See application file for complete search history.

(56) References Cited

U.S. PATENT DOCUMENTS

| | | | | |
|---|---|---|---|---|
| 2005/0015444 | A1* | 1/2005 | Rambo | 709/204 |
| 2005/0216549 | A1* | 9/2005 | Amano et al. | 709/202 |
| 2006/0059431 | A1* | 3/2006 | Pahud | 715/751 |
| 2007/0165834 | A1* | 7/2007 | Redman et al. | 379/395 |
| 2007/0239825 | A1* | 10/2007 | Walter | 709/204 |
| 2010/0020955 | A1* | 1/2010 | Wengrovitz | 379/202.01 |
| 2010/0153858 | A1* | 6/2010 | Gausman et al. | 715/757 |
| 2013/0204949 | A1* | 8/2013 | Elleouet et al. | 709/206 |
| 2014/0258416 | A1* | 9/2014 | Kurupacheril et al. | 709/205 |

* cited by examiner

*Primary Examiner* — Siu Lee

(57) ABSTRACT

A conference call may be implemented between multiple user devices via a conference call server. A user may use a graphical interface of the user device to communicate with the conference call server and control the conference call in various ways. For instance, the user may add a user device to the conference call, drop a user device from the conference call, organize the user devices into conference call groups, record one or more user devices within the conference call, prevent a user device from hearing the audio input of another user device, filter out background noise from the conference call, and receive a call from outside the conference call without having to leave the conference call.

20 Claims, 17 Drawing Sheets

CONFERENCE CALL SYSTEMS AND METHODS

BACKGROUND

Conference call technologies provide solutions for three or more individuals with telephones to speak to one another simultaneously. However, currently available conference call technologies include various limitations. Examples of such limitations may include failing to provide solutions for adding and removing individuals from a conference call, controlling what each individual can hear during the conference call, recording specific individuals within the conference call, filtering out background noise from the conference call, receiving outside calls during the conference call without having to leave the conference call, and more.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for implementing a conference call wherein a user within the conference call may add or drop one or more users from the conference call, organize users within the conference call into conference call groups, implement privacy controls within the conference call (e.g., specify whether one user may hear and/or be heard by another user), record one or more users within the conference call, filter out background noise from the conference call, receive private calls without having to leave the conference call, and more.

Figure 1:
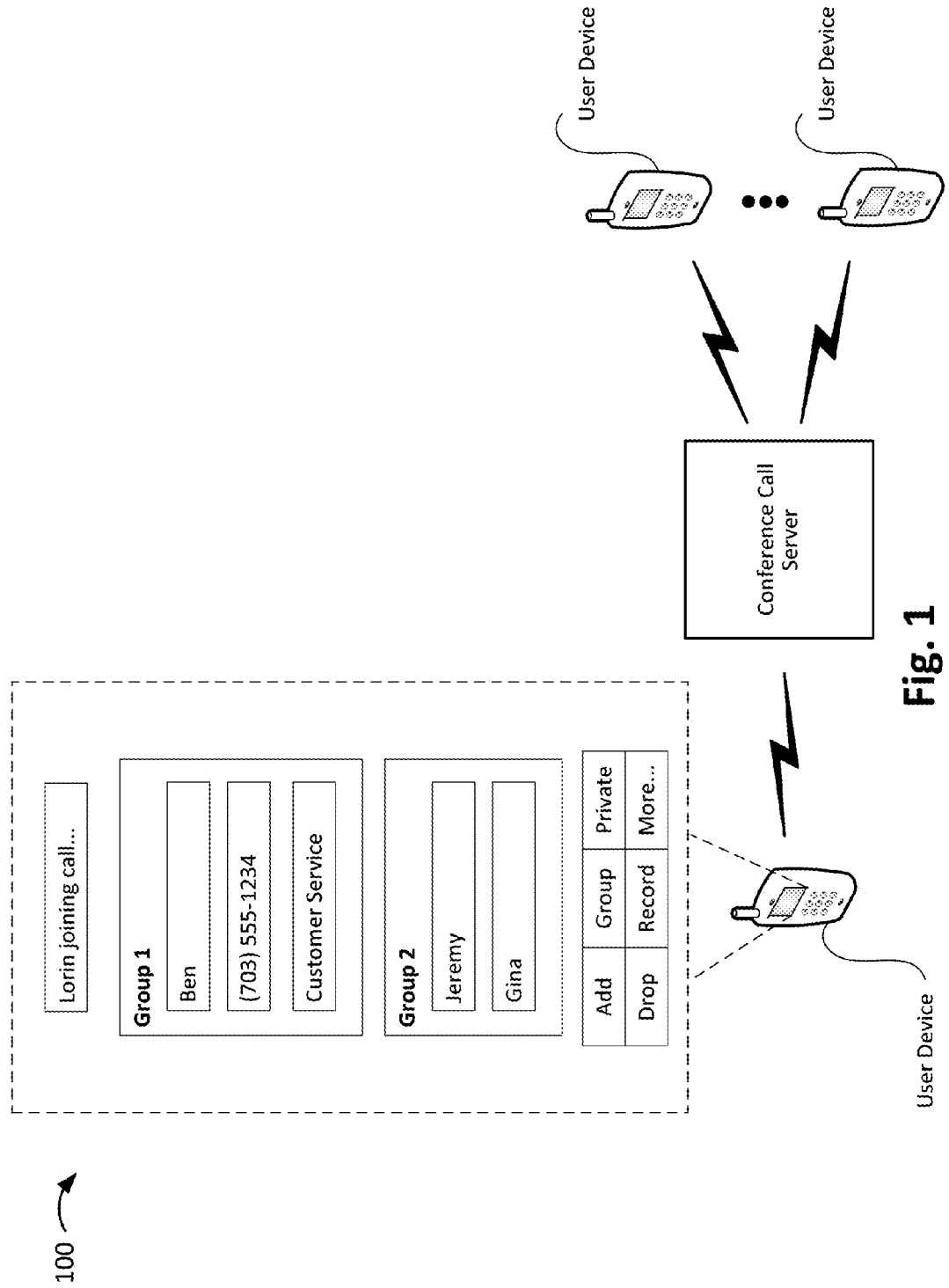
FIG. 1 illustrates an example overview of an implementation described herein.

FIG. 1 illustrates an example overview of an implementation 100 described herein. As shown in FIG. 1, a conference call server may communicate with one or more user devices (e.g., a smartphone, a tablet computer, etc.) to implement a conference call. A user device participating in the conference call may display identification information corresponding to the user devices participating in the conference call (e.g., names, caller identities, telephone numbers, etc.), information regarding user devices joining or leaving the conference call, information relating to conference call groups, such as group names and the users belonging to each group, and one or more command buttons (e.g., an Add button, a Drop button, a Group button, a Record button, a Private button, etc.). In some implementations, the command buttons may include a Video button for implementing a video conference.

The user device may cause the conference call server to perform one or more functions relating to the conference call based on inputs received from a user of the user device. For instance, the conference call server may add a user device to the conference call in response to the user selecting the Add button, drop a user device from the conference call in response to the user selecting the Drop button, create a conference call group in response to the user selecting the Group button, record the conference call in response to the user selecting the Record button, prevent a user device from hearing the audio input of another user device by selecting the Private button, and more. The user may thus, through a graphical interface provided by the user device, dynamically control functionality relating to a conference call or multiple conference calls, while the call(s) are ongoing.

Figure 2:
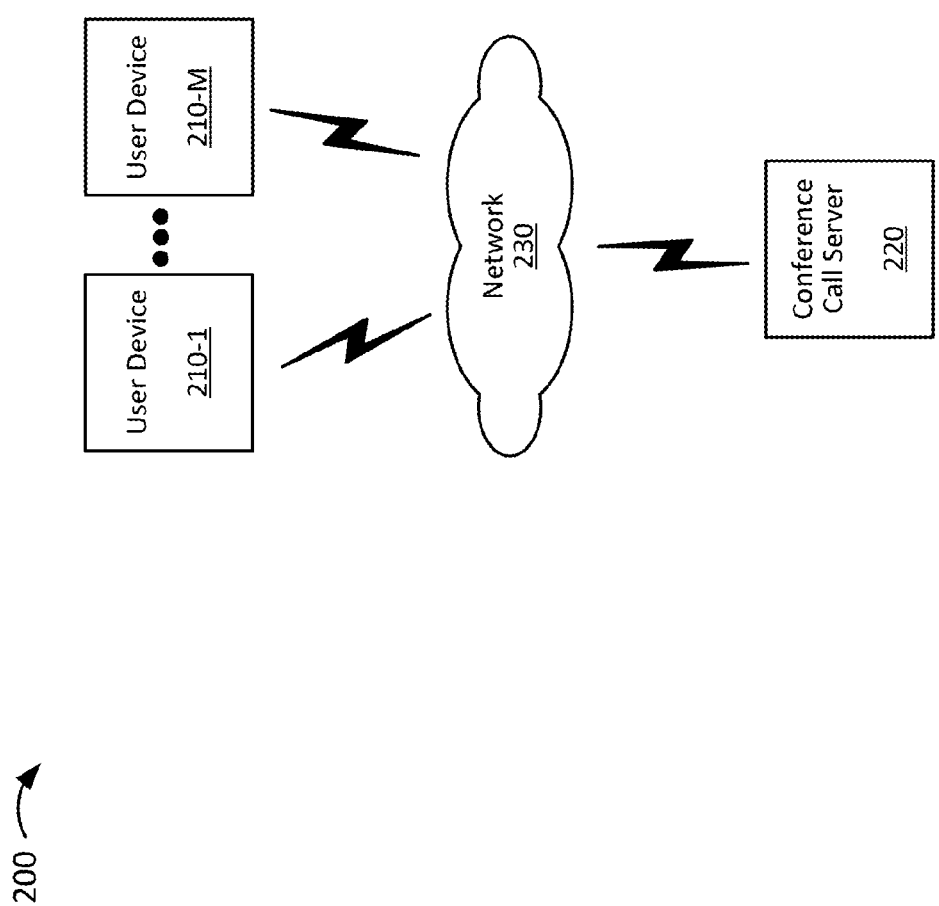
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is an integer greater than or equal to 1), conference call server 220, and network 230.

User device 210 may include a device capable of communicating via a network, such as network 230. For example, user device 210 may correspond to a mobile communication device (e.g., a push-button telephone, a smartphone, or a personal digital assistant (PDA)), a portable computer device (e.g., a laptop computer, a tablet computer, a wearable computer), a desktop computer device, a gaming device, and/or another type of device. In some implementations, user device 210 may display text, graphics, and/or other types of information relating to a conference call. User device 210 may also, or alternatively, display one or more buttons or other types of selectable objects corresponding to one or more functions relating to a conference call. User device 210 may communicate a command and/or other types of information relating to a conference call to conference call server 220, in addition to receiving information relating to the conference call from conference call server 220. In implementations where user device 210 includes a touch-tone telephone, user device 210 may send commands and information to conference call server 220 in response to a user selecting one or more buttons of user device 210 or providing one or more audible commands to user device 210, and may receive information from conference call server 220 in the form of an audio signal.

Conference call server 220 may include one or more computing devices, such as a server device or a collection of server devices. In some implementations, conference call server 220 may receive a command from user device 210 to execute a function relating to a conference call, execute the function, and/or provide user device 210 with information resulting from the execution of the function. Additionally, or alternatively, conference call server 220 may provide one or more additional types of information to user device 210. For instance, conference call server 220 may prompt user device 210 to download a conference call application relating to the conference call and/or provide the conference call application to user device 210. In implementations where user device 210 is a touch-tone telephone, conference call server 220 may prompt user device 210 to join the conference call via a smart phone associated with the push-button telephone.

Network 230 may include one or more wired and/or wireless networks. For example, network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
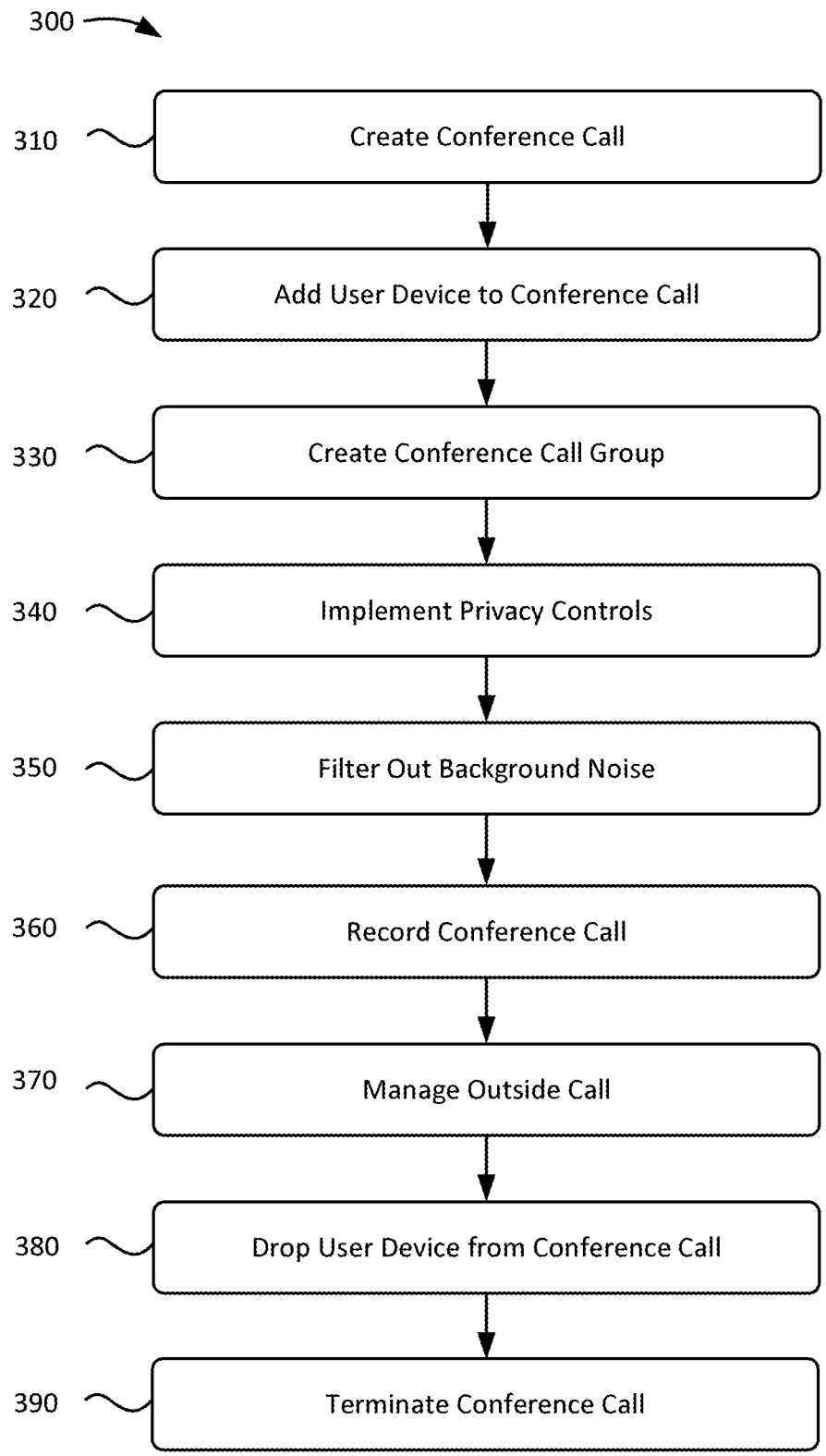
FIG. 3 illustrates a flowchart of an example process for implementing a conference call.

FIG. 3 illustrates a flowchart of an example process 300 for implementing a conference call. In some implementations, process 300 may be performed by conference call server 220. In some implementations, some or all of the blocks of process 300 may be performed by one or more other devices. For instance, some or all of the blocks of process 300 may performed by user device 210. A description of FIG. 3 is provided below with reference to FIGS. 4-12, which provide examples of the operations presented in FIG. 3 from the perspective of user device 210.

As shown in FIG. 3, process 300 may include creating a conference call (block 310). For example, conference call server 220 may create a conference call. In some implementations, conference call server 220 may create the conference call in response to receiving a command to create the conference call (e.g., a create conference call command) from user device 210. A create conference command may include identification information (e.g., a name, a caller identity, a telephone number, etc.) corresponding to user device 210 and/or instructions to create the conference call. Additionally, or alternatively, a create conference command may result from user device 210 executing a conference call application installed on user device 210.

Conference call server 220 may designate user device 210 as a host or moderator of the conference call, which may grant user device 210 one or more authorizations regarding the conference call, such as adding and/or dropping other user devices 210 from the conference call, organizing users within the conference call into conference call groups, implementing privacy controls within the conference call, recording user devices 210 within the conference call, filtering out background noise from the conference call, receiving private calls without having to leave the conference call, etc. Additionally, or alternatively, conference call server 220 may grant user device 210 one or more authorizations based on one or more other factors, such as user device 210 having installed the conference call application, having registered the conference call application, having created an account corresponding to the conference call applications, etc.

Figure 4:
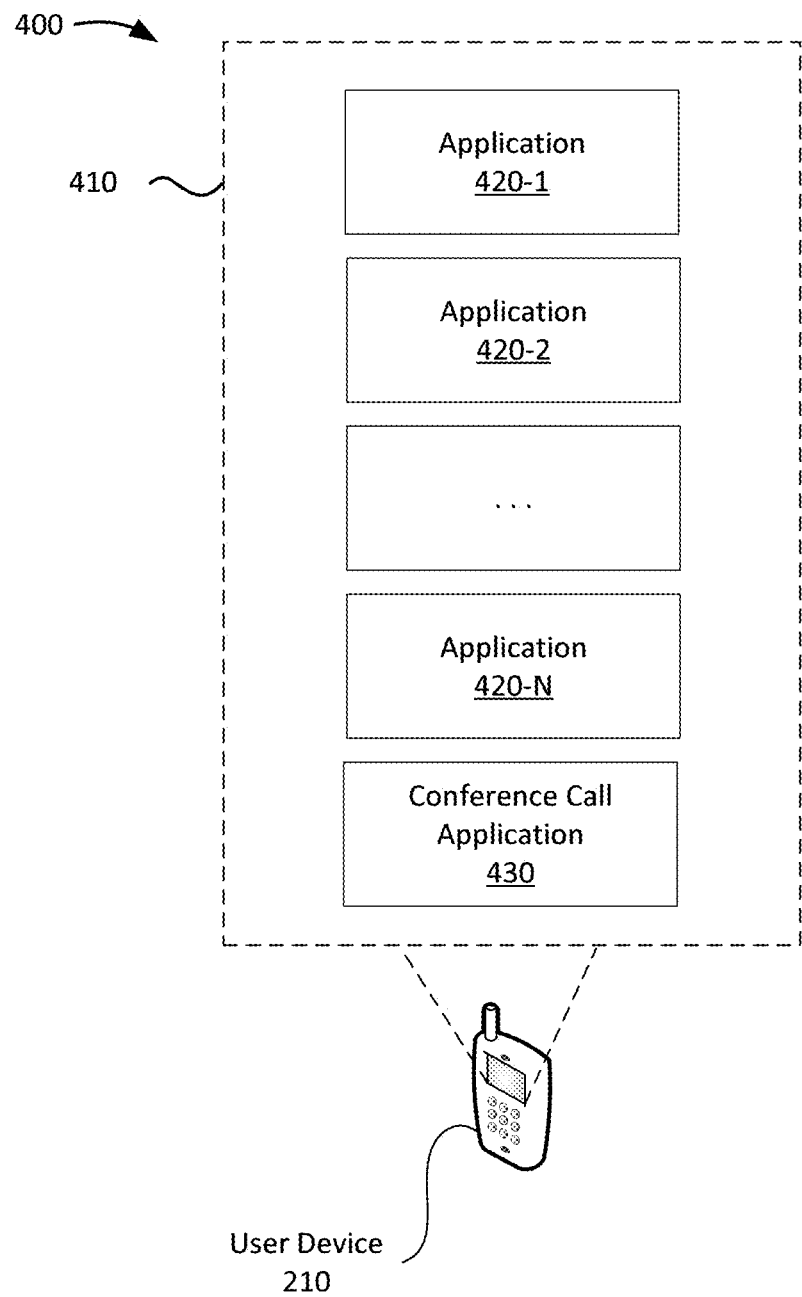
FIG. 4 illustrates an example implementation for creating a conference call from the perspective of a user initiating the conference call.

FIG. 4 illustrates an example implementation 400 for creating a conference call from the perspective of a user initiating the conference call. As shown in FIG. 4, implementation 400 may include user device 210, display screen 410, applications 420-1, 420-2, through 420-N (where N is an integer greater than or equal to 1), and conference call application 430.

Display screen 410 may include a touchable display screen that enables a user of user device 210 to provide inputs to user device 210 by physically touching one or more areas of display screen 410. Additionally, or alternatively, a user may provide inputs to user device 210 in one or more other ways, such as by pressing one or more buttons of user device 210, by speaking one or more audible commands into a microphone of user device 210, by communicating with user device 210 via an auxiliary device connected to user device 210, etc.

Application 420 may include any variety of one or more operating system features or software programs installed on user device 210. Examples of application 420 may include software for sending and receiving telephone calls, software for sending and receiving text messages, software for browsing the Internet, software for watching movies or televisions programs, software for reading or watching news reports, etc. In some implementations, the user of user device 210 may initiate application 420 by physically selecting application 420 on display screen 410.

Conference call application 430 may include an operating system feature or other type of software program installed on user device 210. In some implementations, conference call application 430 may be downloaded and installed by user device 210 from conference call server 220 or from another device of network 230. A user may create a conference call by selecting conference call application 430 on display screen 410, thereby causing user device 210 to communicate a create conference command to conference call server 430 and causing conference call server 220 to create an instance of a conference call that may be populated by user devices 210. In other implementations, a user may cause a conference call to be created by conference call server 220 in one or more alternative ways, such as accessing a website associated with conference call server 220 via a browser application, dialing a telephone number designated for contacting conference call server 220, etc.

Returning to FIG. 3, process 300 may include adding user device 210 to a conference call (block 320). For example, conference call server 220 may add user device 210 to a conference call. In some implementations, conference call server 220 may add user device 210 to the conference call at any time during the conference call. Additionally, or alternatively, conference call server 220 may add user device 210 to the conference call in response to one or more triggers, such as in response to receiving a create conference command from user device 210 (See, e.g., block 310), in response to receiving a request (e.g., an add command) from another user device 210 to add user device 210 to the conference call, in response to receiving a request from user device 210 to join the conference call (which may include, for example, a conference call identifier and/or password associated with the conference call), in response to user device 210 accessing a website associated with conference call server 220 and/or the conference call, in response to user device 210 calling a telephone number associated with conference call server 220 and/or the conference call, etc. In some implementations, conference call server 220 may enable user device 210 to download and install conference call application 430 prior or subsequent to adding user device 210 to the conference call.

Figure 5A:
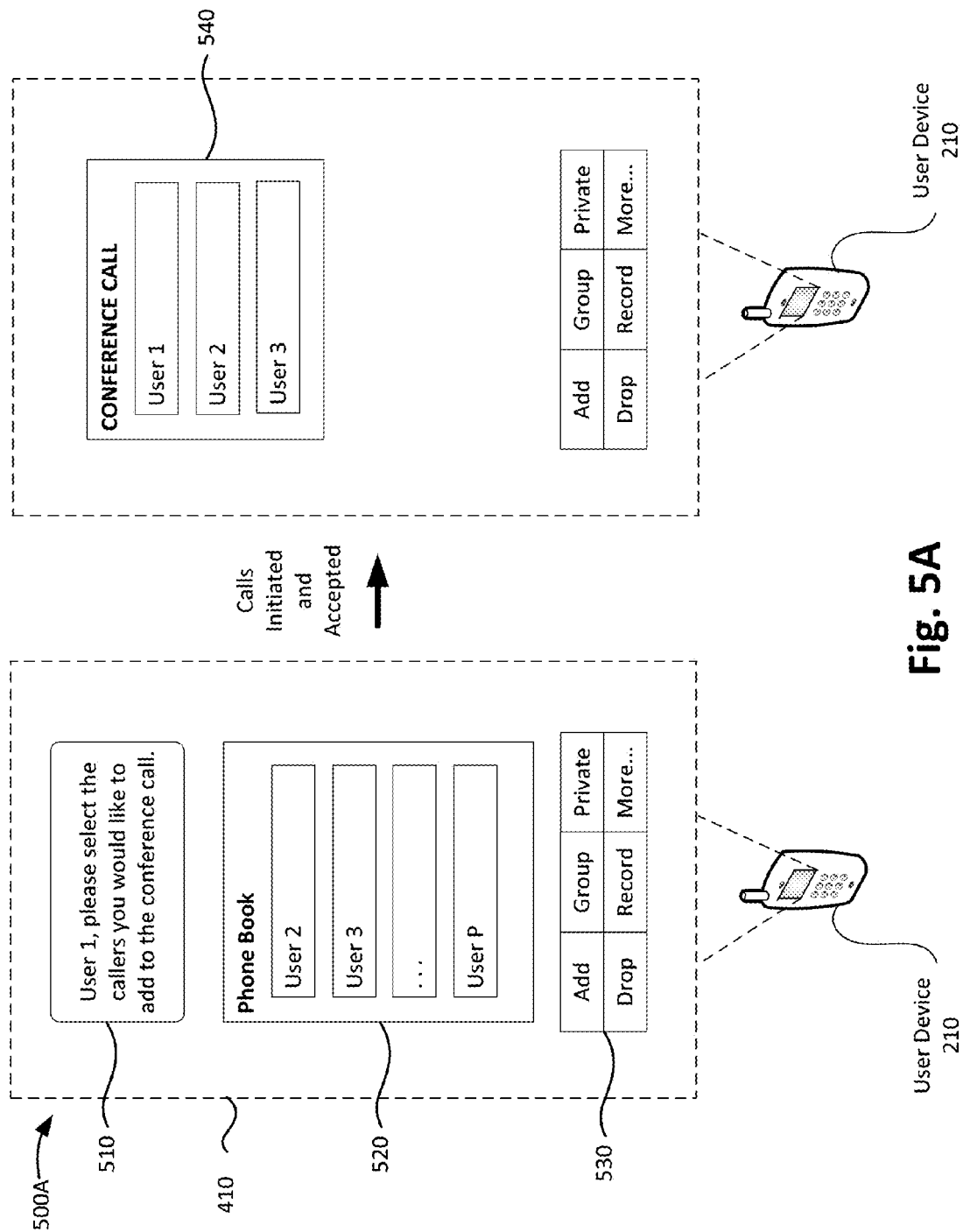
FIG. 5A illustrates an example implementation for adding user devices to a conference call from the perspective of a user device initiating the conference call.

FIG. 5A illustrates an example implementation 500A for adding user devices 210 to a conference call from the perspective of a user initiating the conference call. As depicted in FIG. 5A, implementation 500A may include user device 210, display screen 410, add prompt 510, phone book 520, command buttons 530, and a list of conference call participants 540.

Add prompt 510 may include a statement displayed by display screen 410 that prompts a user of user device 210 to add one or more user devices 210 to a conference call. Phone book 520 may include a list of identification information (e.g., names, caller identifiers, telephone numbers, etc.) corresponding to one or more user devices 210. Phone book 520 may be populated by identification information stored by user device 210, identification information stored by conference call server 220, and/or identification information stored by one or more other devices of network 230. Command buttons 530 may include one or more buttons associated with a function and selectable by a user of user device 210.

In some implementations, a user of user device 210 may cause conference call server 220 to add one or more user devices 210 to a conference call by selecting one or more users in phone book 520 followed by the Add button of command buttons 530. User devices 210 added to a conference call may be presented by display screen 410 as a list of conference call participants 540. In the example illustrated in FIG. 5A, User 1, User 2, and User 3 are added to the conference call by conference call server 220. User 1 may represent the user device 210 initiating the conference call, while User 2 and User 3 may represent user devices 210 added to the conference call by User 1. Additionally, or alternatively, while not illustrated in FIG. 5A, authorizations granted to user devices 210 (e.g., to add user devices, drop user device, etc.) may be indicated to a user (e.g., User 1, User 2, User 3, etc.) one or more ways, including a title, a symbol, a graphic, an image, an animation, a color, and/or one or more other types of schemes that demonstrates one or more authorities granted to user device 210. In some implementations, a user may be able visually add and remove other users from a conference call by performing "drag and drop" operations with respect to display screen 410.

Conference call server 220 may provide graphical information regarding the conference call to user device 210. Graphical information may include one or more types of information communicated between conference call server 220 and user device 210 that can be used by user device 210 to create a graphic or other type of display using display 410. As described throughout this specification, examples of graphical information may include conference call groups, users pertaining to conference call groups, adding or dropping users from a conference call, implemented privacy controls, noise filtering measures, record functions, connecting to outside calls, etc. In some implementations, graphical information may include confirmation information from conference call server 220 that one or more commands received from user device 210 have been implemented, such as a confirmation that a request to move a particular user device 210 to a different conference call group has been successfully executed.

Figure 5B:
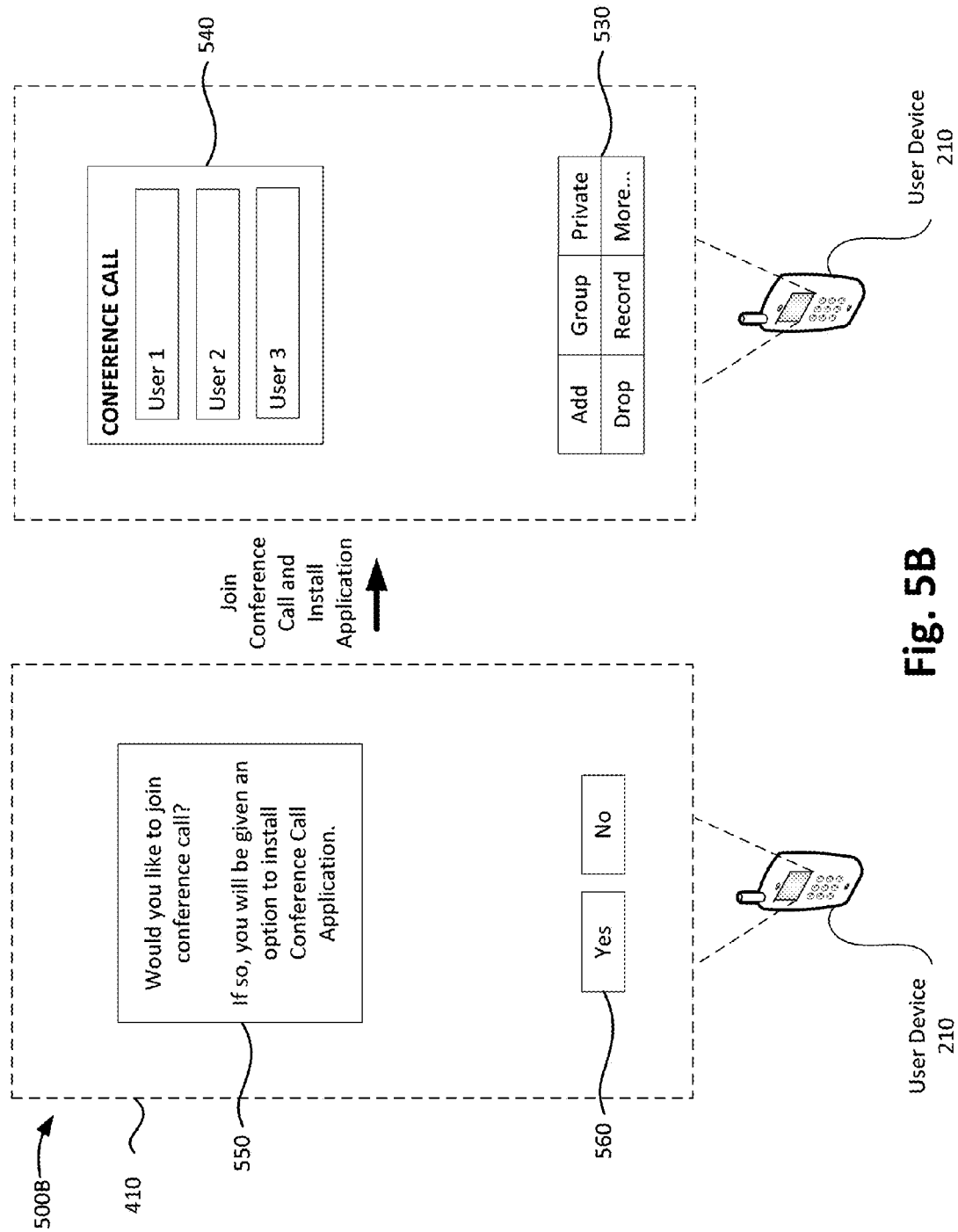
FIG. 5B illustrates an example implementation for adding user devices to a conference call from the perspective of a user invited to the conference call.

FIG. 5B illustrates an example implementation 500B for adding user devices 210 to a conference call from the perspective of a user invited to the conference call. As depicted in FIG. 5B, implementation 500B may include user device 210, display screen 410, list of conference call participants 540, command buttons 530, an invitation to join a conference call 550, and invitation response buttons 560.

Conference call server 220 may send user device 210 an invitation to join a conference call 550. In some implementations, conference call server 220 may send user device 210 the invitation to join a conference call 550 in response to another user device 210 requesting that user device 210 be added to the conference call. Conference call server 220 may add user device 210 to the conference call based on how the user of user device 210 responds to the invitation to join the conference call 550 (e.g., by which of invitation response buttons 560 is selected by the user of user device 210).

In some implementations, conference call server 220 may also, or alternatively, determine whether user device 210 has already installed conference call application 430, and if user device 210 has not installed conference call application 430, provide user device 210 an opportunity to download and install conference call application 430 prior to, during, or after joining the conference call. In some implementations, conference call server 220 may provide user device 210 with a list of conference call participants 540 and/or command buttons 530. As such, depending on the implementations, user device 210 may be granted the same or similar information, functions, and authorizations regarding the conference call as those discussed herein regarding the user device 210 initiating the conference call.

Returning to FIG. 3, process 300 may include creating conference call groups (block 330). For example, conference call server 220 may create one or more conference call groups. A conference call group may include a logical grouping of users that can participate in a conference call via conference call server 220. Conference call server 220 create a conference call group by associating two or more user devices 210 within the conference call to one another. The association may include a group title, a group symbol, a group graphic, a group image, a group animation, a group color, and/or one or more other types of schemes that demonstrates an association or grouping of user devices 210 within a conference call. As will be described in the examples provided below, creating conference call groups may provide one or more benefits, such as maintaining organization within the conference call and ensuring that privacy controls are properly applied to user devices 210 within the conference call.

Figure 6:
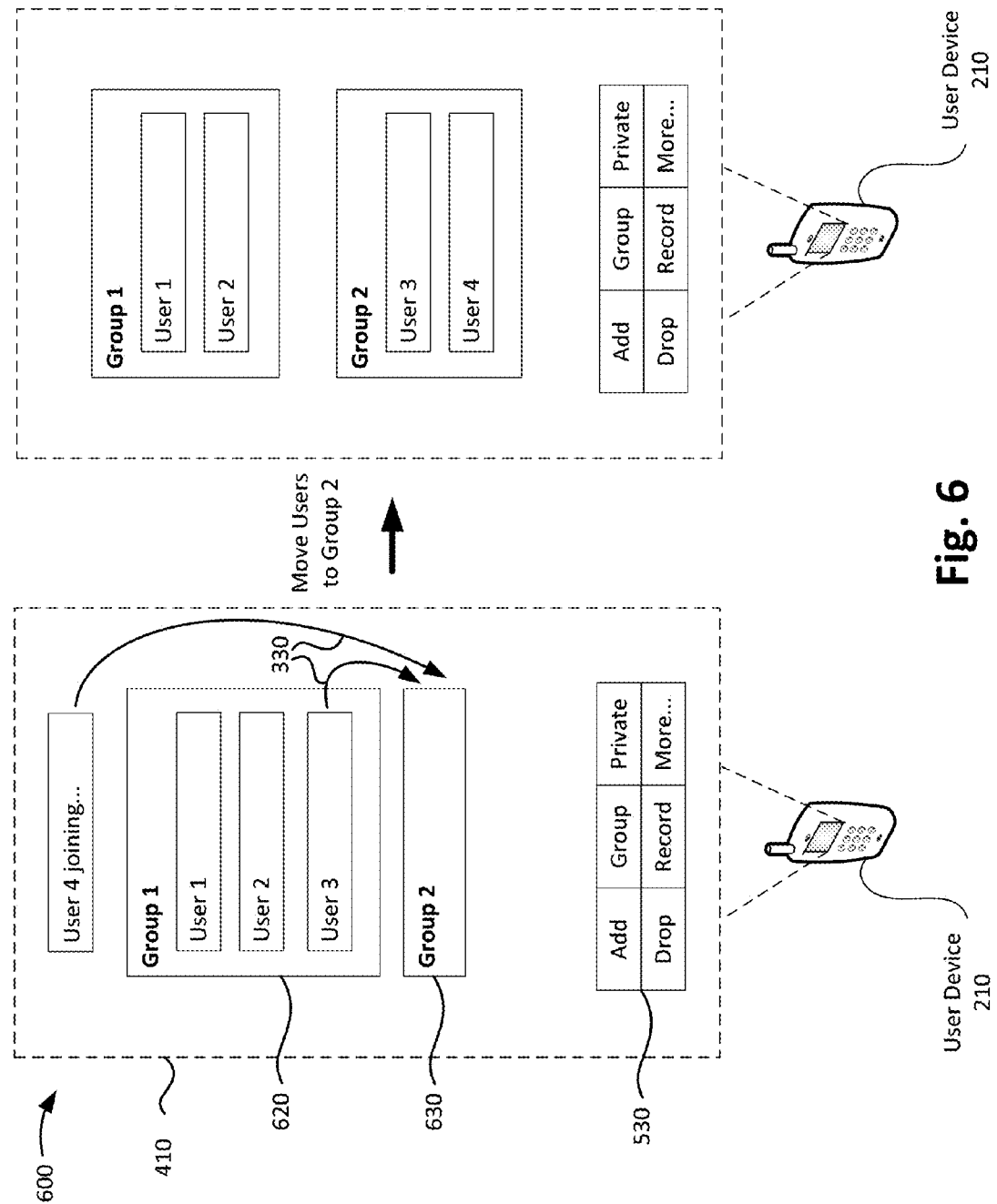
FIG. 6 illustrates an example implementation for creating conference call groups from the perspective of a user.

FIG. 6 illustrates an example implementation 600 for creating conference call groups from the perspective of a user. As depicted in FIG. 6, implementation 600 may include user device 210, display screen 410, command buttons 530, conference call group 620, and conference call group 630.

Conference call server 220 may create conference call groups 620 and 630 within a conference call. In some implementations, conference call server 220 may create conference call groups 620 and 630 in response a user of user device 210 selecting the Group button of command buttons 530. For instance, when a user of user device 210 selects the Group button of command buttons 530 for the first time, conference call server 220 may create conference call group 620 and place each user device 210 participating in the conference call within conference call group 620, which may be displayed by display screen 410 of user device 210. When the user selects the Group button of command buttons 530 for the second time, conference call server 220 may create conference call group 630, which may be displayed by display screen 410 of user device 210.

The user of user device 210 may cause conference call server 220 to organize or assign the user devices 210 attending the conference call and/or joining the conference call into conference call groups 620 and 630 by moving (e.g., via a graphical drag and drop operation) an entry representing a particular user or user device 210 (e.g., User 1, User 2, User 3, etc.) to the appropriate conference call group. For example, as represented by arrows 330 depicted in FIG. 6, the user of user device 210 may move the user or user devices 210 represented by User 3 and User 4 to group 630, and in response, conference call server 220 may associate User 1 and User 2 with conference call group 620 and User 3 and User 4 with conference call group 630, which may be displayed to the user by display screen 410 of user device 210. In some implementations, a user may be an actual user account or an identifier, such as a name (and not necessarily a phone number of a mobile device). As such, the user may, for example, login to conference call server 220 via a smartphone, tablet, etc., and because the user is identified by name/account name, user could be placed in the correct conference call.

In some implementations, the user of user device 210 may add, remove, and/or rearrange users from one group to another throughout the conference call. Additionally, or alternatively, conference call server 220 may modify the volumes applied to each user device 210 according to the position of one user device 210 with respect to another user device 210. For instance, a user device 210 of conference call group 620 may hear the other user devices 210 of conference call group 620 at normal volume and the user devices of conference call group 630 at a decreased volume.

Volume levels may be changed and controlled by user device 210 and/or conference call server 220. For example, a user may be on multiple conference calls simultaneously and my designate one as a primary conference call and another as a secondary conference call, such that when someone is speaking in the primary conference call, speakers in the secondary conference call are muted, have a decreased volume applied to their audio input, and/or have their speaking shown only via automatic transcription. When the person in the primary conference call is done speaking, volume may be restored to the secondary conference call. In yet another example, the user may designation of one or more users participating in the conference call as "primary speakers," such that if there is a conflict in speakers speaking simultaneously, the non-primary speakers are muted, have a decreased volume applied to their audio input, and/or have their speaking shown only via automatic transcription. When the primary speakers are not speaking, volume may be restored to the non-primary speakers.

Returning now to FIG. 3, process 300 may include implementing privacy controls (block 340). For example, conference call server 220 may implement one or more privacy controls. In some implementations, conference call server 220 may implement privacy controls by designating the conversation of one conference call group (e.g., conference call group 620) as private with respect to another conference call group (e.g., conference call group 630) such that the conversations occurring in the private conference call group cannot be heard by the other conference call group. Additionally, or alternatively, conference call server 220 may implement privacy controls by designating a conversation involving two or more user devices 210 as private with respect to the remaining user devices 210 within the conference call.

In some implementations, when privacy controls between two or more user devices 210 have been implemented, such that the conversation between the user devices 210 cannot be heard by the remaining user devices 210 within the conference call, conference call server 220 may indicate (with, for example, a title, a symbol, a graphic, an image, an animation, a color, and/or one or more other types of labeling schemes) to the remaining user devices 210 not involved in a private conversation that a private conversation is occurring within the conference call. In some implementations, conference call group privacy settings can have one or more default privacy controls, such that one or more privacy controls are implemented in response to conference call server 220 creating one or more conference call groups.

Figure 7A:
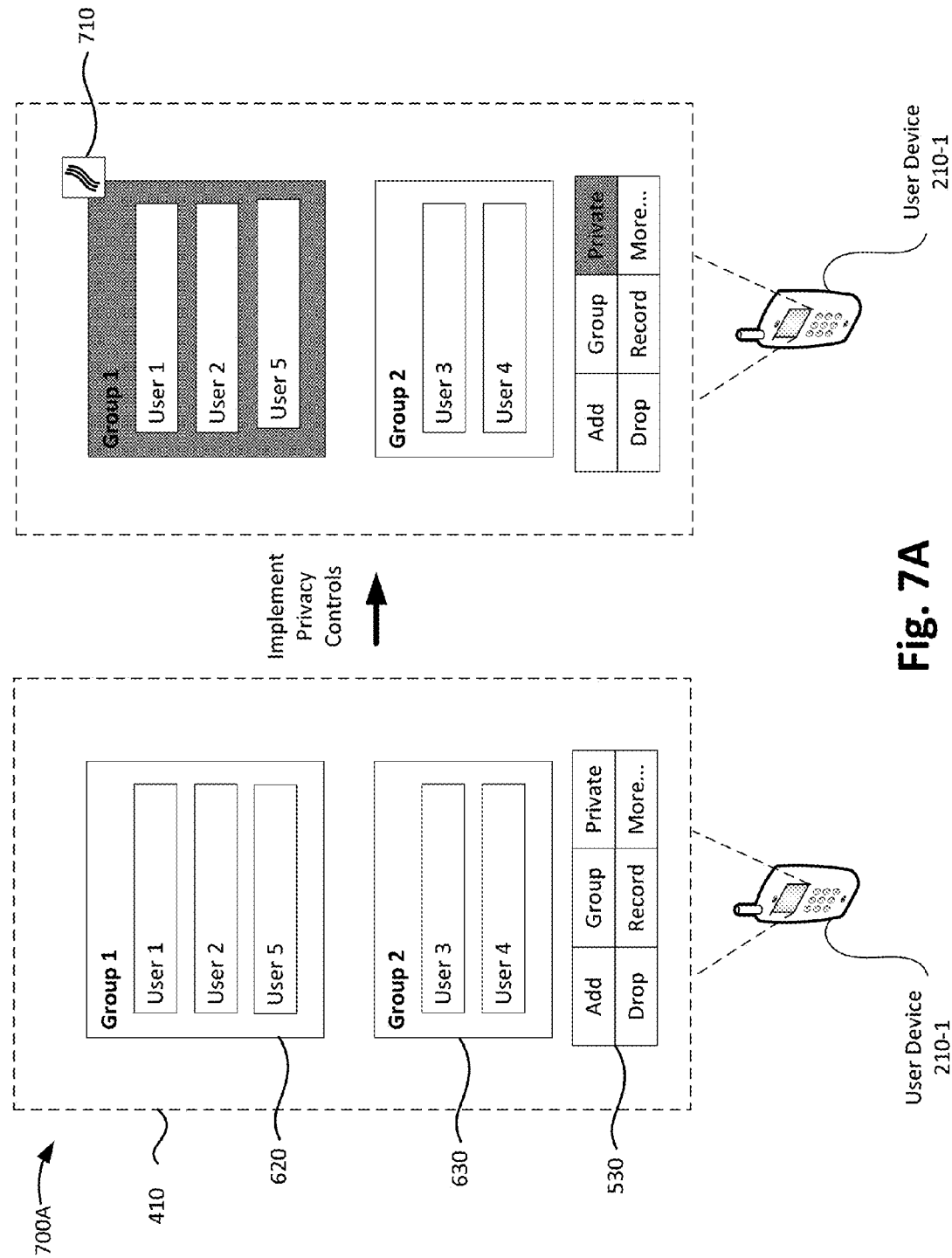
FIGS. 7A-7B illustrate example implementations for implementing privacy controls within a conference call from the perspective of a user.
Figure 7B:
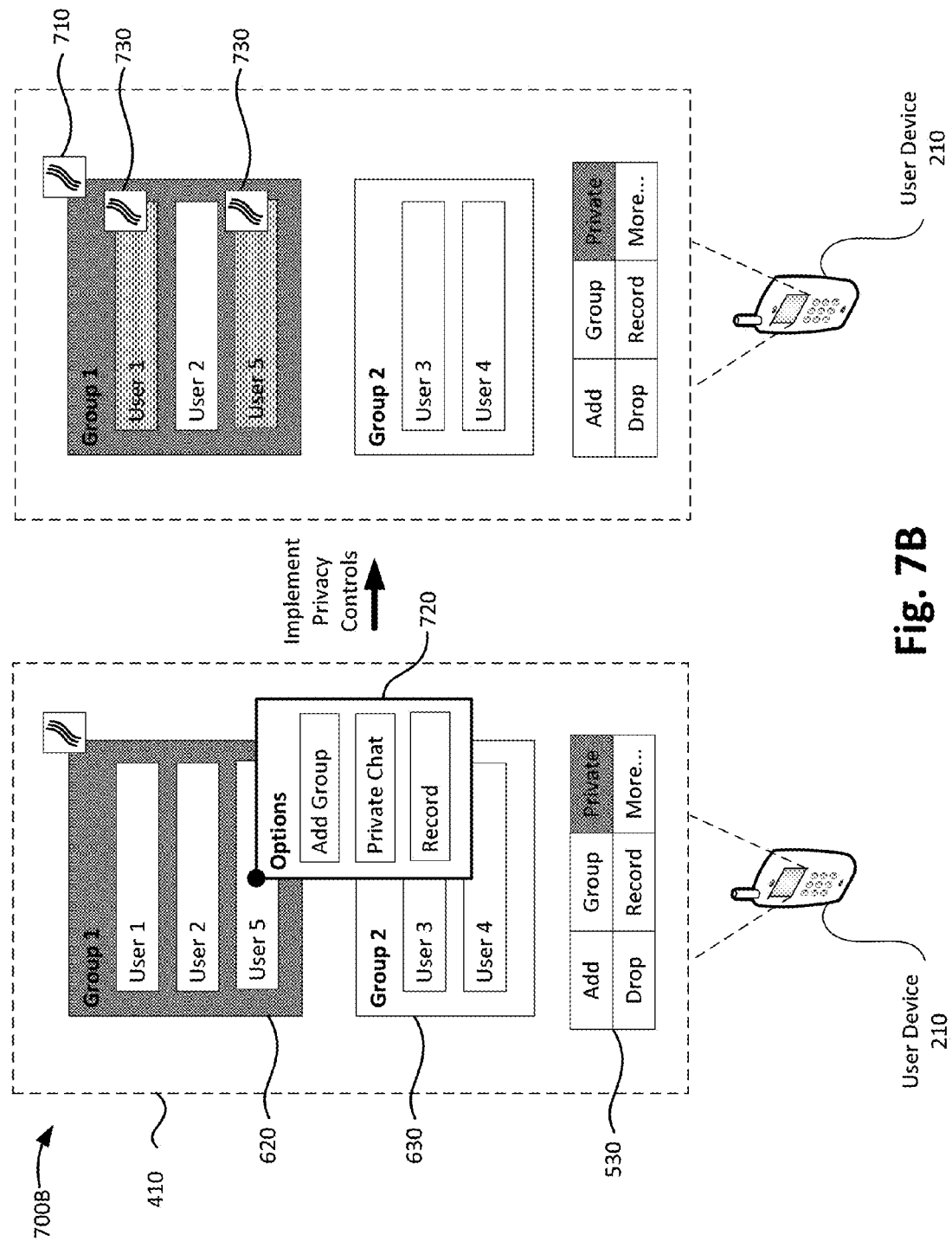

FIGS. 7A-7B illustrate example implementations 700A and 700B for implementing privacy controls within a conference call from the perspective of a user. As depicted in FIGS. 7A-7B, implementations 700A and 700B may include user device 210, display screen 410, command buttons 530, conference call groups 620 and 630, activity graphic 710, options menu 720, and activity graphics 730.

In the example of FIG. 7A, a user of user device 210 may decide to make the conversations within conference call group 620 private so that the conversations of conference call group 620 will only be heard by users that are explicitly invited into conference call group 620. As such, the user may cause conference call server 220 to implement such privacy controls within a conference call by selecting conference call group 620 and the Private button of command buttons 530. Display screen 410 of user device 210 may show the private relationship between conference call group 620 and the Privacy button of command buttons 530 by color coding conference call group 620 and the Privacy button of command buttons 530, as illustrated in FIG. 7A. Additionally, or alternatively, display screen 410 may display and/or animate activity graphic 710 whenever the users of conference call group 620 are speaking to one another. Displaying and/or animating activity graphic 710 may enable user devices 210 of conference call group 630 to know that a conversation is occurring in conference call group 620 and that users in other conference call groups are unable to listen to the conversation.

In the example of FIG. 7B, the user of user device 210 may decide to make a conversation between User 1 and User 5 private so that the conversation is not head by User 2. The user may, for example, access private options menu 720 (e.g., by touching the entry for User 5 for several seconds or several times in succession) and select the Private Chat option of options menu 720. In response, conference call server 220 may implement privacy controls between User 1 and User 5, such that User 2 is unable to listen to the conversation occurring between User 1 and User 5. Display screen 410 of user device 210 may show a private relationship between User 1 and User 5 by color coding User 1 and User 5, as illustrated in FIG. 7B. Additionally, or alternatively, conference call server 220 may cause display screen 410 to display activity graphics 730 whenever User 1 and User 2 are speaking to one another so that User 2 (and/or conference call group 630) may know that a conversation is occurring between User 1 and User 5.

Referring now to FIG. 3, process 300 may include filtering out background noise (block 350). For example, conference call server 220 may filter out background noise. In some implementations, conference call server 220 may filter out background noise from a conference call in response to receiving a command (e.g., a filter noise command) from user device 210 to filter out background noise from one or more user devices 210 and/or one or more conference call groups 620 and 630. In some implementations, the filter noise command may include identification information (e.g., a name, a caller identity, a telephone number, etc.) of a selected user device 210 within the conference call and/or instructions to filter out background noise, and/or conference call server 220 may identify a particular user device 210 within the conference call based on the filter noise command, and filter out the background noise of the selected user device 210 in accordance with the filter noise command.

In some implementations, conference call server 220 may filter out background noise from a conference call by monitoring an audio input of user device 210, identifying the voice of the user of user device 210 based on the audio input, and/or removing sounds from further audio inputs of user device 210 that do not pertain to the voice of the user. In some implementations, conference call server 220 may cause display screen 410 of user device 210 to indicate (e.g., via a title, a symbol, a graphic, an animation, a color, and/or one or more other types of labeling schemes) that the audio input of user device 210 is being filter for noise.

Figure 8:
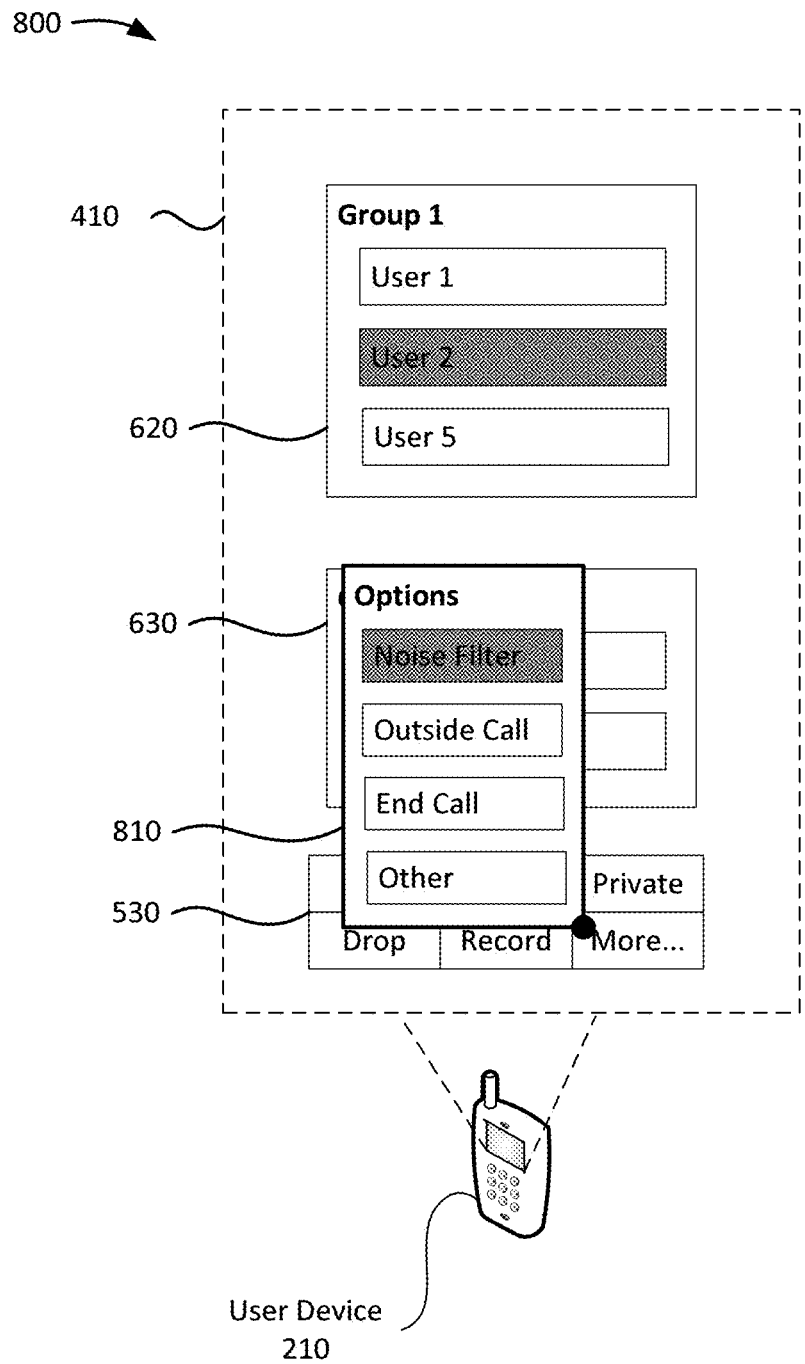
FIG. 8 illustrates an example implementation for filtering out background noise from a conference call from the perspective of a user.

FIG. 8 illustrates an example implementation 800 for filtering out background noise from a conference call from the perspective of a user. As depicted in FIG. 8, implementation 800 may include user device 210, display screen 410, command buttons 530, conference call groups 620 and 630, and options menu 810.

In the example depicted in FIG. 8, User 2 of conference call 620 may be participating in the conference call while in a geographic location that may have one or more background noises, such as traffic, construction, people talking, music, etc. The background noise may be heard by others in conference call group 620 and/or conference call group 630. As such, the user (e.g., User 1) of user device 210 may select User 2 within display screen 410, select the More button of command buttons 530, and select the Noise Filter button of options menu 810. In response, conference call server 220 may analyze an audio input of User 2, identify the voice corresponding to User 2 from audio input of User 2, and filter out the background noise from the audio input of User 2. Additionally, or alternatively, conference call server 220 may cause display screen 410 of user device 210 to show a relationship between User 2 and the Noise Filter option of option menu 810 by color coding User 2 and the Noise Filter option of option menu 810, as illustrated in FIG. 8.

Referring now to FIG. 3, process 300 may include recording a conference call (block 360). For example, conference call server 220 may record a conference call. In some implementations, conference call server 220 may record one or more user devices 220 and/or one or more conference call groups 620 and 630 at any time and for any duration during the conference call. In some implementations, conference call server 220 may record a conference call in response to receiving a record command from user device 210. The record command may include one or more instructions relevant to recording the conference call, such as which user devices 210 should be record, when the recording should begin (e.g., immediately, at a specified time, in response to a particular trigger such as a specified user device 210 joining the conference call, etc.), when the recording should end (e.g., immediately, at a specified time, in response to a particular trigger such as a specified user device 210 leaving the conference call, etc.), etc. Additionally, or alternatively, the recording of a conference call may be stored by conference call server 220 and/or communicated to user device 210 for storage and/or playback.

In some implementations, conference call server 220 may implement selective voice recording capabilities. For instance, user 2 may include several individuals participating in the conference call via a single speaker telephone (e.g., in a speaker or conference mode). In such a situation, conference call server 220 may be capable of identifying a particular voice from among the several individuals using the speaker phone and record only the identified voice.

Figure 9A:
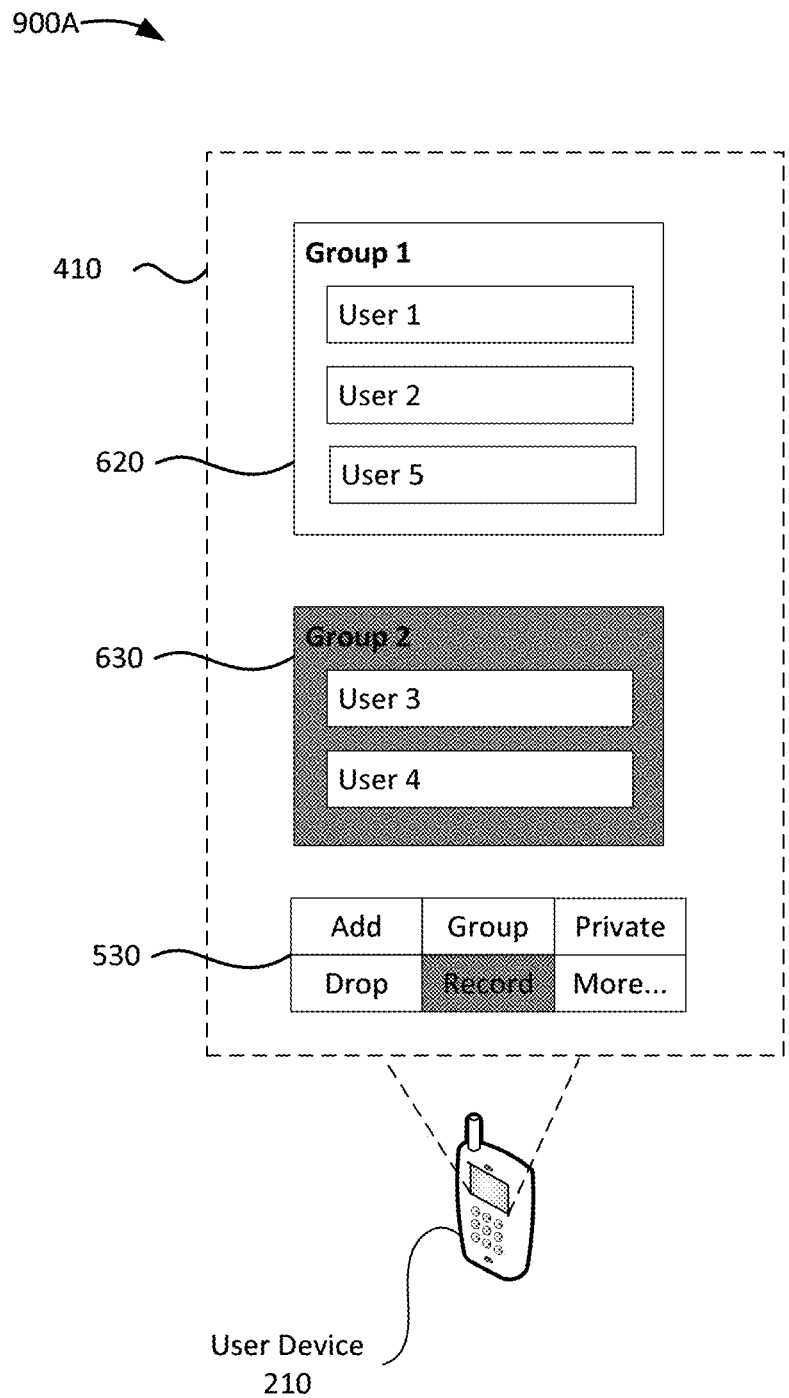
FIGS. 9A-9B illustrate example implementations for recording a conference call from the perspective of a user.
Figure 9B:
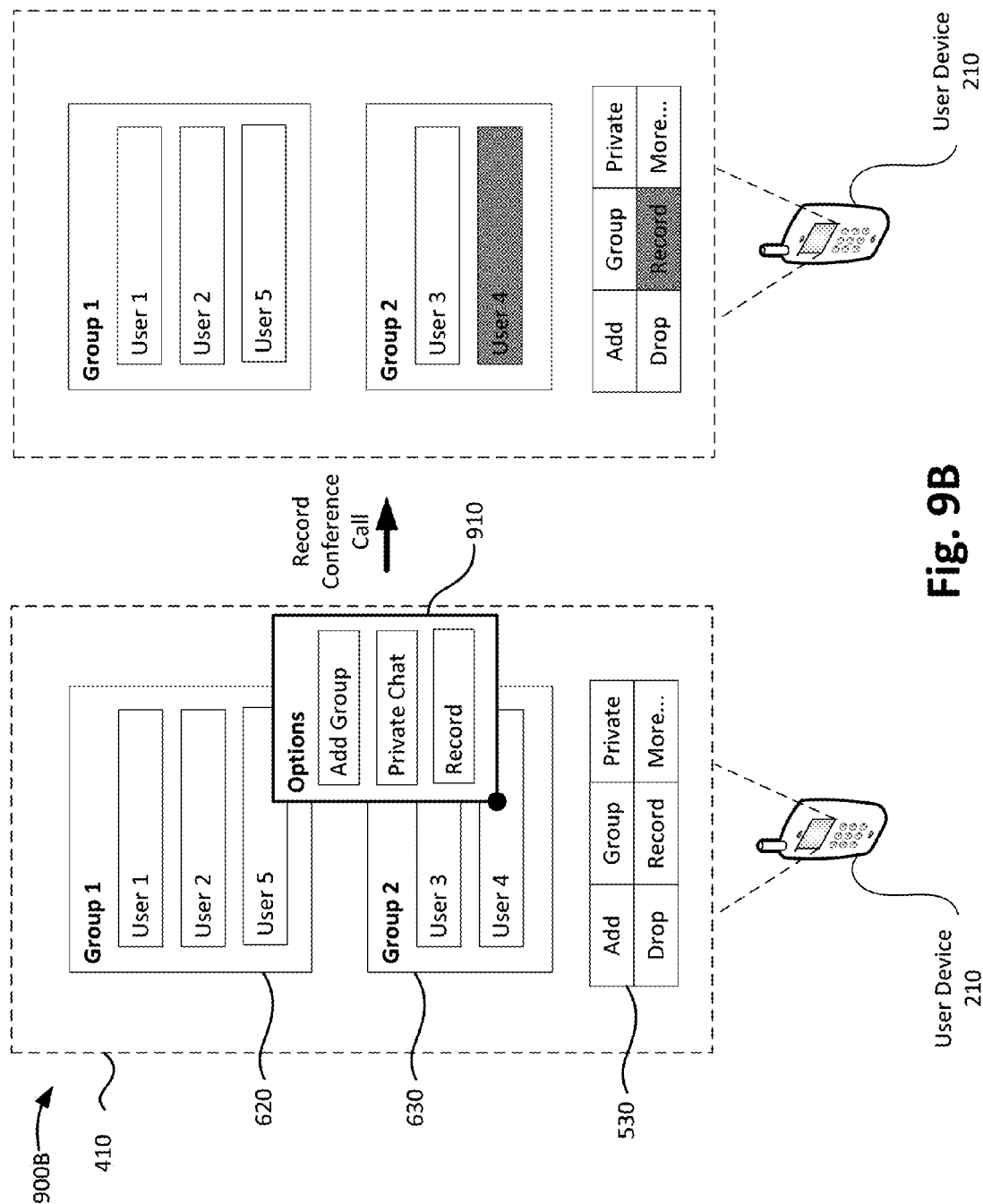

FIGS. 9A-9B illustrate example implementations for recording a conference call from the perspective of a user. As depicted in FIGS. 9A-9B, implementations 900A and 900B may include user device 210, display screen 410, command buttons 530, conference call groups 620 and 630, and options menu 910.

In the example depicted in FIG. 9A, a user of user device 210 may record conference call group 630 by selecting conference call group 630 and selecting the Record button of command buttons 530 in display screen 410. Doing so may cause user device 210 to communicate a record command to conference call server 220, and conference call server 220 may respond to the record command by beginning to record conference call group 630. In this particular example, only the audio inputs of User 3 and User 4 will be recorded, and not the audio inputs of User 1, User 2, or User 3.

Display screen 410 may indicate to a user of user device 210 that conference call group 630 is being recorded by displaying a color-coded relationship between conference call group 630 and the Record button of command buttons 530, as shown in FIG. 9A. In some implementations, the user of user device 210 may end the recording by again selecting the Record button of command buttons 530, which may cause user device 210 to communicate a discontinue recording command to conference call server 220, and conference call server 220 may discontinue recording conference call group 630 in response to receiving the discontinue recording command.

In the example depicted in FIG. 9B, a user of user device 210 may record a particular User (e.g., User 4) within a conference call by accessing options menu 910 for User 4 (e.g., by touching the entry for User 4 for several seconds or several times in succession) and selecting the Record button from options menu 910 in display screen 410. Doing so may cause user device 210 to communicate a record command for User 4 to conference call server 220, and conference call server 220 may respond to the record command by beginning to record User 4 of conference call group 630. Thus, in this particular example, only User 4 of conference call group 630 will be recorded, and not User 3 of conference call group 630 or any of the users in conference call group 620.

Display screen 410 may indicate to the user of user device 210 that User 4 User 4 of conference call group 630 is being recorded by displaying a color-coded relationship between User 4 of conference call group 630 and the Record button of command buttons 530, as shown in FIG. 9B. In some implementations, the user of user device 210 may end the record by again selecting the Record button of command buttons 530, which may cause user device 210 to communicate a discontinue recording command regarding User 4 to conference call server 220, and conference call server 220 may discontinue recording User 4 in response to receiving the discontinue recording command.

Referring now to FIG. 3, process 300 may include managing outside calls (block 370). For example, conference call server 220 may manage outside calls. An outside call may include a call between user device 210 within a conference call and another device (e.g., another user device 210) outside of the conference call. In some implementations, conference call server 220 may receive a request (e.g., an outside call request) from user device 210 to contact another user device 210 that is not participating in the conference call, and conference call serve 220 may respond to the outside call request by enabling user device 210 to contact the other user device 210 without having to leave the conference call.

In some implementations, user device 210 may communicate the outside call request to conference call server 210 in response to the user device 210 outside of the conference call attempting to call user device 210 and user device 210 selecting a button of display 410 to indicate that user device 210 would like to accept the call from the user device 210 outside of the conference call. In some implementations, user device 210 may communicate the outside call request to conference call server 210 in response to the user of user device 210 deciding to call a user device 210 outside of the conference call and selecting one or more buttons of display 410 to initiate the call to the user device 210 outside of the conference call. In some implementations, conference call server 220 may perform one or more operations to cooperate with a cellular network (e.g., a network of network 230) to manage an outside call and/or connect user device 210 with the user device 210 outside of the conference call.

In some implementations, the user of user device 210 may speak to an individual outside of the conference call while still listening to the conference call. In such implementations, the volume of the conference call may be lowered or otherwise controlled (by conference call server 220 and/or user device 210) during the outside call so that the conference call has minimal interference with the outside call. Additionally, or alternatively, conference call server 220 may enable the user of user device 210 to toggle between participating in the conference call and participating in the outside call without having to terminate either the conference call or the outside call prematurely.

Figure 10:
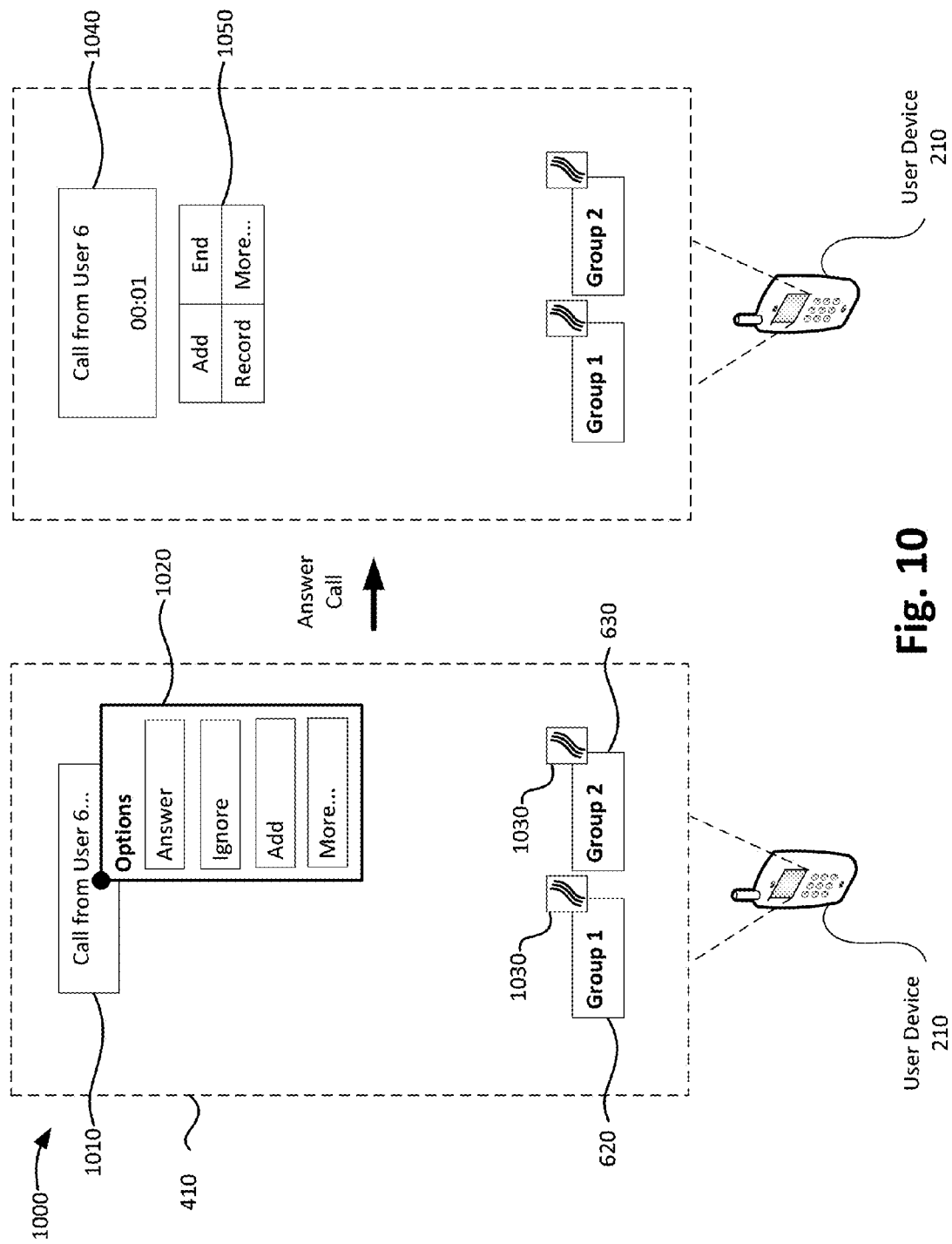
FIG. 10 illustrates an example implementation for managing an outside call from the perspective of a user.

FIG. 10 illustrates an example implementation for managing an outside call from the perspective of a user. As depicted in FIG. 10, implementation 1000 may include user device 210, display screen 410, conference call groups 620 and 630, outside call notification 1010, call options menu 1020, activity graphics 1030, outside call status 1040, and outside call buttons 1050.

In the example depicted in FIG. 10, user device 210 may receive an outside call from another device, such as another user device 210. In response to receiving the outside call, user device 210 may use display screen 410 to display outside call notification 1010 and/or options menu 1020. Outside call notification 1010 may include one or more types of information informing the user of user device 210 that an outside call is being received, such as identification information (e.g., a name, a caller identify, a telephone number, etc.) of the device or caller attempting to contact user device 210. Call options menu 1020 may include one or more buttons, such as an Answer button to answer the outside call, an Ignore button to ignore the outside call, an Add button to add the outside call to the conference call, and a More button to access one or more additional functions relating to the outside call.

Additionally, or alternatively, user device 210 may hide, remove, simplify, minimize, modify, etc., one or more interface objects. In the depicted example of FIG. 10, user device 210 conference call groups 620 and 630 are minimized and activity graphics 1030 are placed over conference call groups 620 and 630. Activity graphics 1030 may be visible and/or animated to indicate to the user of user device 210 that conversations are occurring within conference call groups 620 and 630.

As described above, the user of user device 210 may select the Answer button of call options menu 1020 to answer the incoming call. In response to the user selecting the Answer button, conference call server 220 may enable user device 210 to receive the outside call and/or user device 210 may display outside call status 1040 and outside call buttons 1050. Outside call status 1040 may include one or more of a variety of information relating to the ongoing status of the outside call, such as identification information (e.g., name, caller identifier, telephone number, etc.), the duration of the call, etc. Outside call buttons 1050 may include one or more selectable buttons for controlling the outside call, such as an Add button to add the outside call to the conference call, an End button to terminate the outside call, a Record button to record the outside call, and a More button to access other types of functions relating to the outside call.

Referring now to FIG. 3, process 300 may include dropping user device 210 from a conference call (block 370). For example, conference call server 220 may drop user device 210 from a conference call. In some implementations, conference call server 220 may receive a drop command corresponding to a selected user device 210 within a conference call from user device 210. The drop command may include identification information (e.g., a name, a caller identify, a telephone number, etc.) corresponding to a user device 210 to be dropped along with instructions to drop the selected user device 210 from the conference call. In response to the drop command, conference call server 220 may identify the user device 210 to be using the identification information in the drop command and/or remove the particular user device 210 from the conference call.

Figure 11:
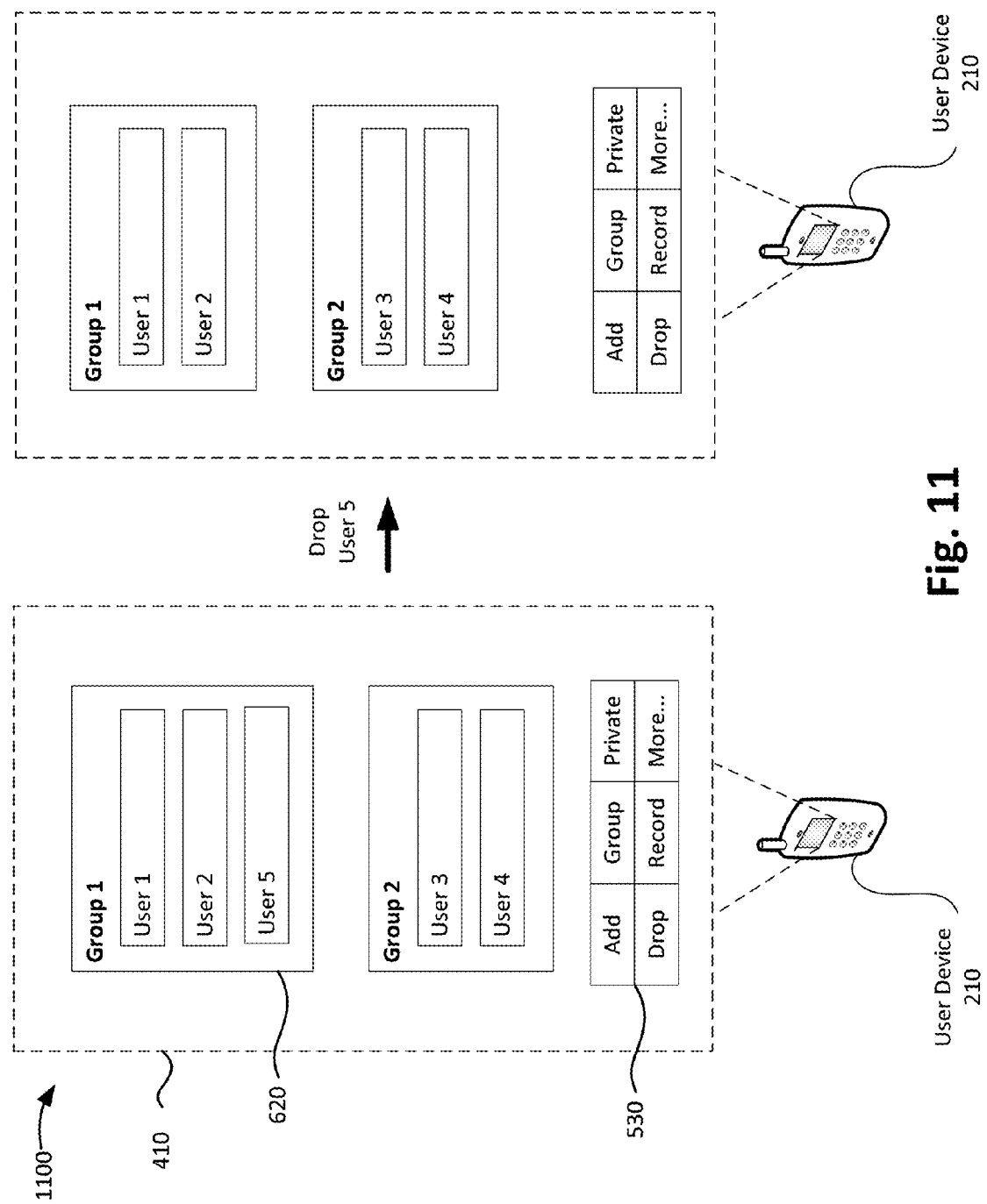
FIG. 11 illustrates an example implementation for dropping a user from a conference call from the perspective of a user.

FIG. 11 illustrates an example implementation for dropping user device 210 from a conference call from the perspective of a user. As depicted in FIG. 11, implementation 1100 may include user device 210, display screen 410, conference call groups 620 and 630, and command buttons 530.

In the example depicted in FIG. 11, a user of user device 210 may decide to remove User 5 or any other user from the conference call. The user of user device 210 may select User 5 of group 620 on display screen 410 and select the Drop button from command buttons 530. Doing so may cause a drop command to be sent from user device 210 to conference call server 220, to which conference call 220 may respond by removing the user device 210 corresponding to User 5 from the conference call. Conference call 220 may also, or alternatively, communicate the removal of User 5 from the conference call, resulting in an update to display screen 410 to show that User 5 is no longer participating in the conference call.

Referring now to FIG. 3, process 300 may include terminating a conference call (390). For example, conference call server 220 may terminate a conference call. In some implementations, conference call server 220 may terminate the conference call in response to receiving a terminate conference command from user device 210. The terminate conference command may include identification information (e.g., a conference call key, a unique identifier, etc.) corresponding to the conference call for scenarios where, for example, conference call server 220 is managing multiple conference calls simultaneously. In some implementations, when terminating a conference call, conference call server 220 may drop any and all user devices 210 currently participating in the conference call. In other implementations, conference call server 220 may only drop the user device 210 sending the terminate conference command.

Figure 12:
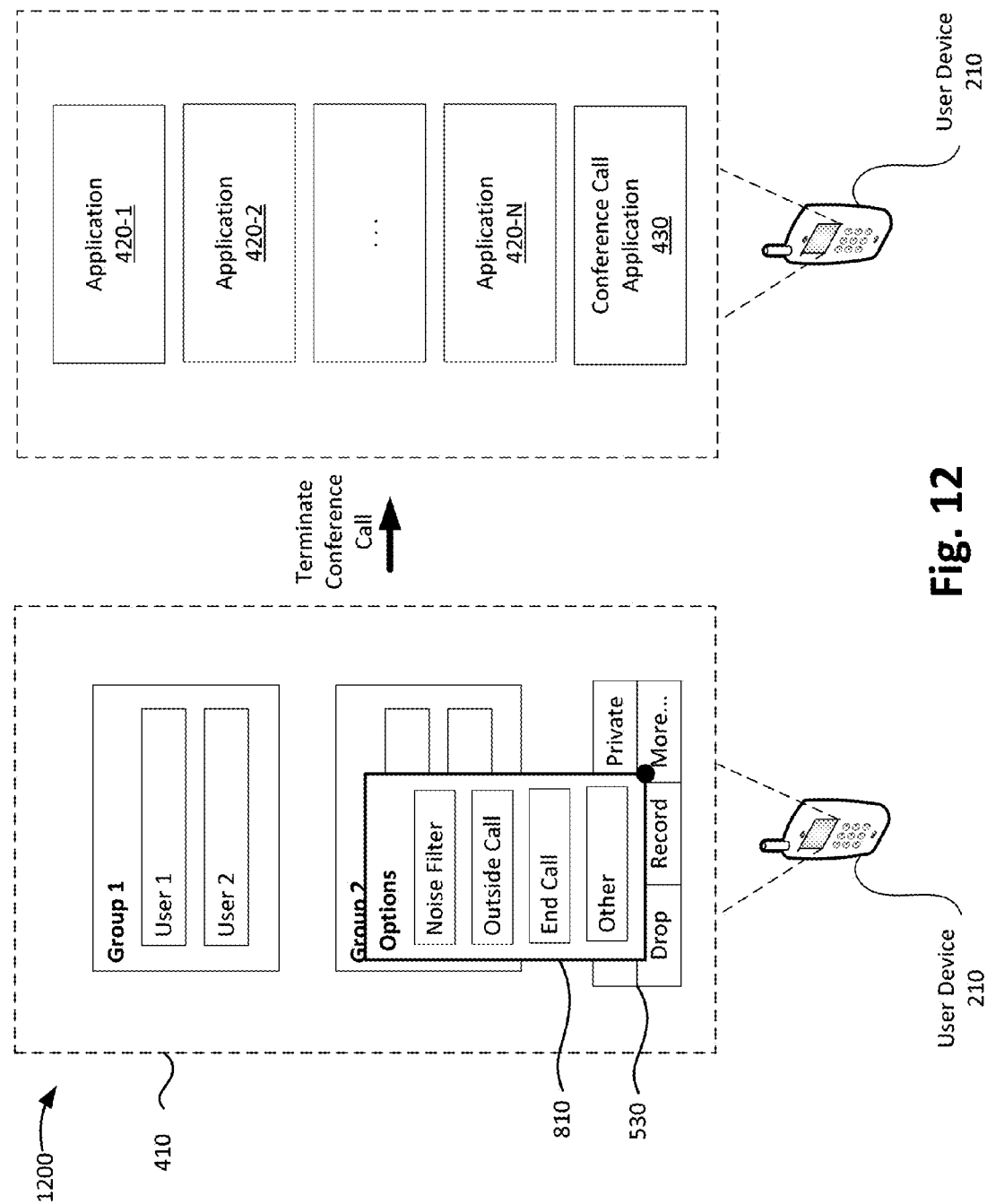
FIG. 12 illustrates an example implementation for terminating a conference call from the perspective of a user.

FIG. 12 illustrates an example implementation for terminating a conference call from the perspective of a user. As depicted in FIG. 12, implementation 1200 may include user device 210, display screen 410, applications 420, conference call groups 620 and 630, command buttons 530, and options menu 810.

In the example depicted in FIG. 12, a user of user device 210 may decide to terminate a conference call. To do so, the user may select the More button of command buttons 530 to display options menu 810, and select the End Call button from options menu 810. In response to the user selecting the End Call button, user device 210 may communicate a terminate conference command to conference call server 220, and conference call server 220 may respond to the terminate conference command by dropping all of the user devices 210 participating in the conference call. Conference call server 220 may also, or alternatively, communicate to user device 210 that the conference call has been terminated, and/or user device 210 may cause display screen 410 to display a home screen of user device 210, which may include icons or other graphics representing one or more applications 420 installed on user device 210.

As described above, FIGS. 4-12 provide example implementations of operations shown in FIG. 3. It should be noted, however, that while FIG. 3 shows a flowchart diagram of an example process 300 for implementing a conference call, in other implementations, a process for implementing a conference call may include fewer operations, different operations, differently arranged operations, and/or additional operations than depicted in FIG. 3. Similarly, while FIGS. 4-12 show example implementations with various features, in other implementations, example implementations may include fewer features, different features, differently arranged features, and/or additional features than the features depicted in FIGS. 4-12.

Figure 13:
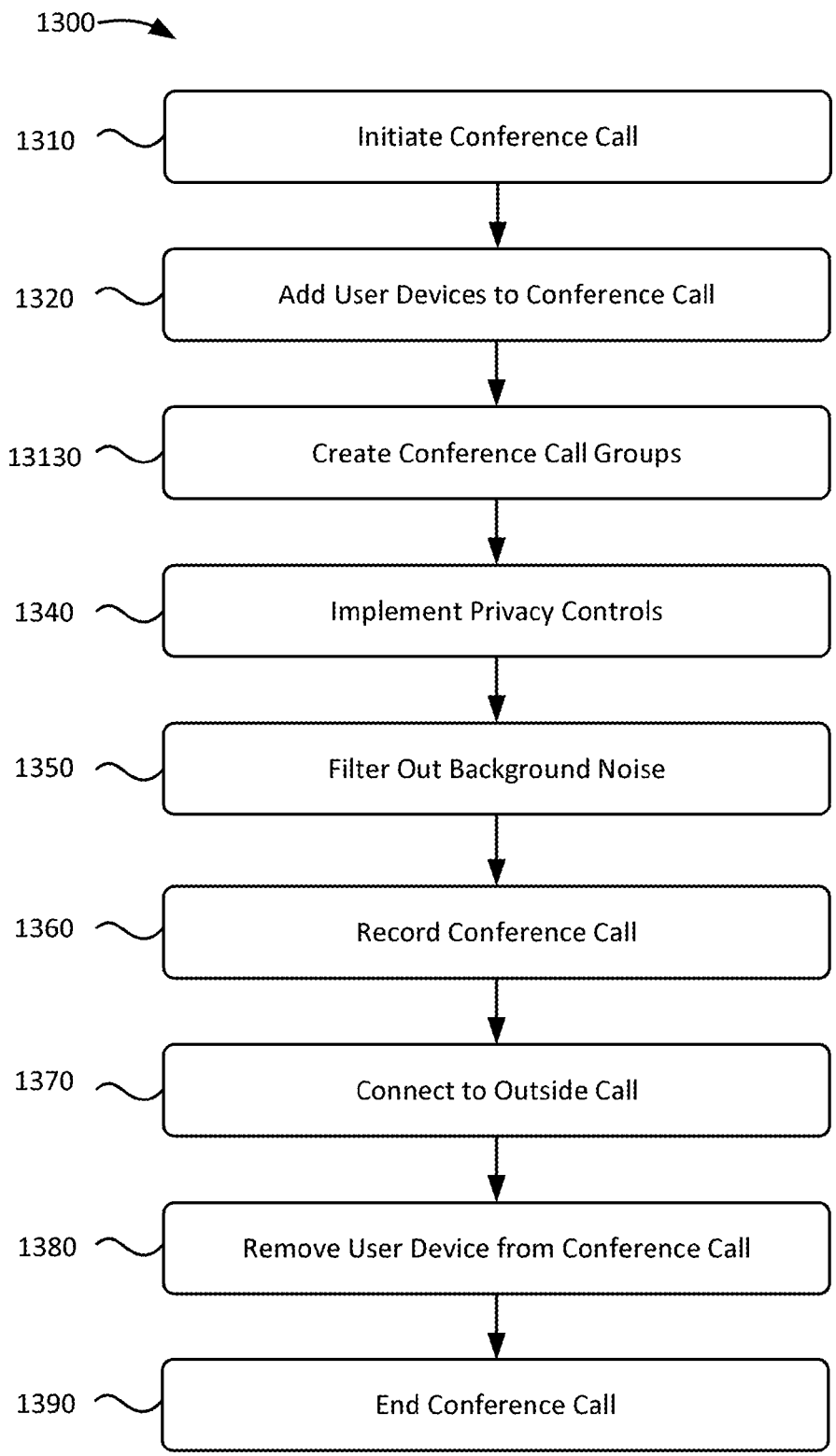
FIG. 13 illustrates a flowchart of an example process for implementing a conference call from the perspective of a user device.

FIG. 13 illustrates a flowchart of an example process 1300 for implementing a conference call from the perspective of user device 210. In some implementations, process 1300 may be performed by user device 210. Also, while FIG. 13 shows a flowchart diagram of an example process 1300 for implementing a conference call, in other implementations, a process for implementing a conference call may include fewer operations, different operations, differently arranged operations, and/or additional operations than depicted in FIG. 13.

As shown in FIG. 13, process 1300 may include initiating a conference call (block 1310). For example, user device 210 may initiate a conference call. In some implementations, user device 210 may initiate the conference call by communicating a conference call create command to conference call server 220. In some implementations, user device 210 may create the conference call in response to receiving an input from a user of user device 210 to execute conference call application 430 and/or one or more other types of inputs from the user, such as a request to create a conference call. Additionally, or alternatively, user device 210 may initiate a conference call by providing a feature and/or performing a function described above with respect to FIGS. 1-3 and 4.

Process 1300 may include adding user devices 210 to a conference call (block 1320). For example, user device 210 may add one or more user devices 210 to a conference call. In some implementations, user device 210 may add a user device to a conference call by communicating an add command to conference call server 220, which may include one or more types of identification information corresponding to the user devices 210 to be added. In some implementations, user device 210 may add user devices 210 to a conference call in response to a user of user device 210 selecting an entry in phonebook 520, dialing a telephone number, and/or by inputting one or more other types of information into user device 210. In some implementations, user device 210 may automatically be added to a conference call by creating a conference call (see block 1310), by being in a call with another user device 210 that creates a conference call, and/or by one or more other ways. Additionally, or alternatively, user device 210 may add user devices 210 to a conference call by providing a feature and/or performing a function described above with respect to FIGS. 1-3, 5A, and 5B.

Process 1300 may include creating conference call groups (block 1330). For example, user device 210 may create conference call groups. As stated above, a conference call group may include a logical grouping of users that can participate in a conference call via conference call server 220. User device 210 may create a conference call group by receiving a command from a user of user device 210 to create the conference call group along with an indication of one or more user devices 210 to associate with the conference call group and/or communicating a command (e.g., a create group command) to conference call server 220 to create the conference call group along with the identities of the user devices 210 to be associated with the conference call. In some implementations, user device 210 may add, remove, and/or rearrange user devices 210 within or between conference call groups at any point during the conference call. Additionally, or alternatively, user device 210 may create a conference call group by providing a feature and/or performing a function described above with respect to FIGS. 1-3 and 6.

Process 1300 may include implementing privacy controls (block 1340). For example, user device 210 may implement one or more privacy controls. In some implementations, user device 210 may implement a privacy control by receiving a request from a user of user device 210 to keep a conversation between two or more user devices 210 and/or conference call groups 620 and 630 private with respect to one or more other user devices 210 and/or conference call groups 620 and 630 within the conference call, along with identification information regarding the corresponding user devices 210 and/or conference call groups 620 and 630, and/or communicating a command (e.g., a privacy control command) to conference call server 220 to implement the privacy control along with the identification information regarding the corresponding user devices 210 and/or conference call groups 620 and 630. Additionally, or alternatively, user device 210 may implement a privacy control by providing a feature and/or performing a function described above with respect to FIGS. 1-3, 7A, and 7B.

Process 1300 may include filtering out background noise (block 1350). For example, user device 210 may filter out background noise. In some implementations, user device 210 may filter out background noise from a conference call by communicating a filter noise command to conference call server 220. In some implementations, user device 210 may do so in response to receiving a request from a user to filter out background noise from the conference call. The filter noise command may include identification information corresponding to one or more user devices 210 and/or conference call groups 620 and 630 along with instructions for filtering out background noise. Additionally, or alternatively, user device 210 may filter out background noise from a conference call by providing a feature and/or performing a function described above with respect to FIGS. 1-3 and 8.

Process 1300 may include recording a conference call (block 1360). For example, user device 210 may record a conference call. In some implementations, user device 210 may record a conference call by communicating a record command to conference call server 220. In some implementations, user device 210 may do so in response to receiving a request from the user of user device 210 to record one or more user devices 210 and/or conference call groups 620 and 630 of the conference call. A record command may include identification information corresponding to one or more user devices 210 and/or user device groups 620 and 630 along with instructions for recording the conference call. Additionally, or alternatively, user device 210 may record a conference call by providing a feature and/or performing a function described above with respect to FIGS. 1-3, 9A, and 9B.

Process 1300 may include connecting to an outside call (block 1370). For example, user device 210 may connect to an outside call. In some implementations, user device 210 may connect to an outside call by communicating an outside call request to conference call server 220. An outside call request may include a request to establish a call between user device 210 and a user device 210 outside the conference call without leaving the conference call and/or without permitting to the user device outside the conference call to participate in the conference call. In some implementations, user device 210 may communicate the outside call request to conference call server 220 in response to receiving a request from a user to connect to the outside call. Additionally, or alternatively, user device 210 may connect to an outside call by providing a feature and/or performing a function described above with respect to FIGS. 1-3, and 10.

Process 1300 may include removing user device 210 from the conference call (block 1380). For example, user device 210 may remove another user device 210 from a conference call. In some implementations, user device 210 may remove another user device 210 from a the conference call by communicating a drop command to conference call server 220. A drop command may include identification information corresponding one or more user devices 210 and/or conference call groups 620 and 630 along with instructions for removing the one or more user devices 210 and/or one or more conference call groups 620 and 630. In some implementations, user device 210 may communicate the drop command to the conference call server 220 in response to receiving a request from a user to drop one or more user devices 210 and/or one or more conference call groups 620 and 630 from the conference call. Additionally, or alternatively, user device 210 may remove another user device 210 from a conference call by providing a feature and/or performing a function described above with respect to FIGS. 1-3, and 11.

Process 1300 may include ending a conference call (block 1390). For example, user device 210 may end a conference call. In some implementations, user device 210 may end the conference call by communicating a terminate conference command to conference call server 220. In some implementations, user device 210 may end the conference call in response to receiving a request from a user of user device 210 to terminate the conference call, the user closing conference call application 430, and/or one or more other types of inputs from the user. Additionally, or alternatively, user device 210 may end a conference call by providing a feature and/or performing a function described above with respect to FIGS. 1-3 and 12.

Figure 14:
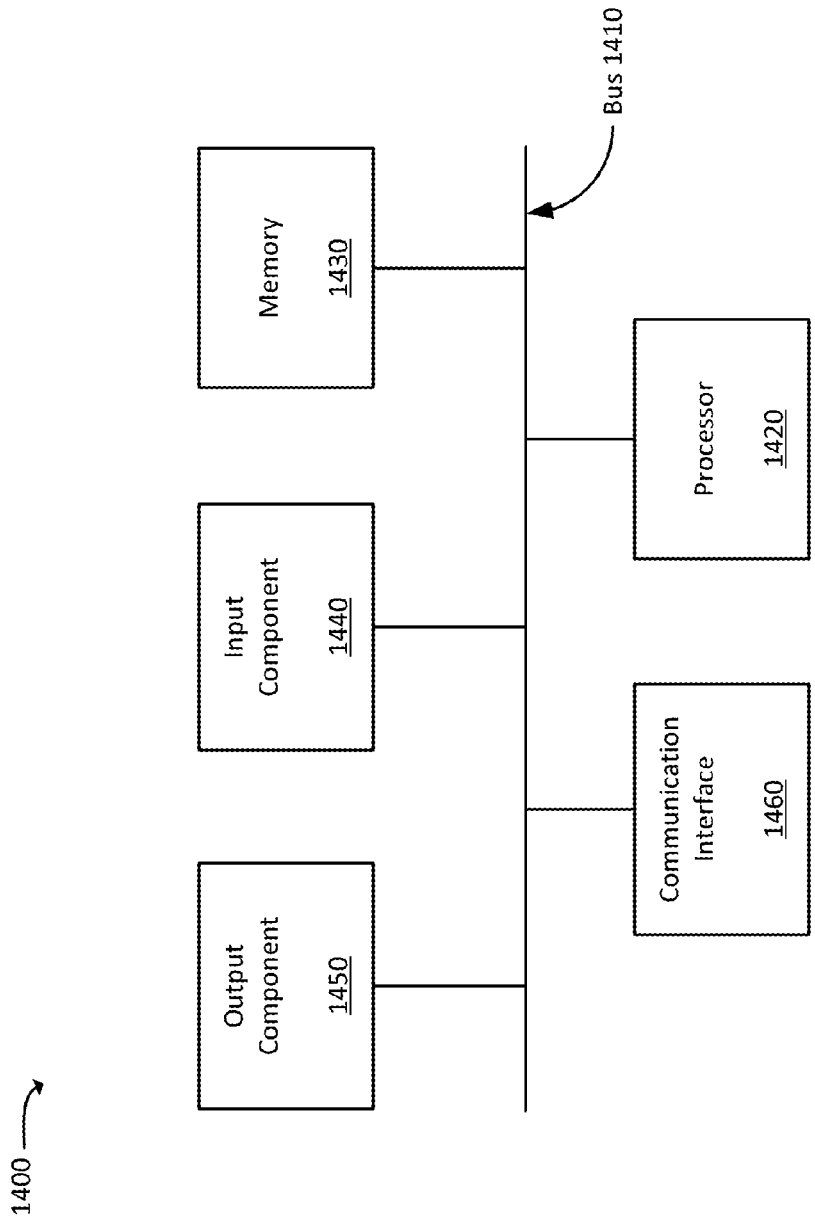
FIG. 14 illustrates example components of one or more devices, according to one or more implementations described herein.

FIG. 14 is a diagram of example components of device 1400. One or more of the devices described above (e.g., with respect to FIGS. 1, 2, and 4-12) may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes (LEDs), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms) as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   creating, by a conference call server, a conference call comprising at least three user devices, the at least three user devices being capable of participating in the conference call by providing audio inputs to the conference call server;
   creating, by the conference call server, a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices;
   implementing, by the conference call server, privacy control within the conference call by preventing at least one audio input corresponding to the first conference call group from being accessible to the second conference call group; and
   providing, by the conference call server, the at least three user devices graphical information comprising the first conference call group comprising the at least two of the at least three user devices, the second conference call group comprising the at least one of the at least three user devices, and the implemented privacy control within the conference call;
   receiving a filter noise command from one of the at least three user devices, the filter noise command comprising identification information corresponding to a user device of the at least three user devices and an instruction to filter out background noise for the user device of the at least three user devices;
   identifying the user device of the at least three user devices based on the identification information of the filter noise command; and
   filtering out background noise from an audio input of the identified user device within the conference call.

2. The method of claim 1, wherein filtering out background noise from the audio input of the identified user device comprises:
   identifying a voice of a user of the identified user device based on the audio input of the identified user device; and
   removing audio information from the audio input that does not correspond to the voice of the user of the identified user device.

3. The method of claim 1, further comprising:
   wherein creating the conference call comprises:
       receiving a create conference command from one of the at least three user devices;
       designating the one of the at least three user devices as a host for the conference call; and
       granting the one of the at least three user devices at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

4. The method of claim 1, further comprising:
   receiving an add command to add a user device from one of the at least three user devices to the conference call;
   adding the user device to the conference call in accordance with the add command; and
   granting the user device at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

5. The method of claim 1, further comprising:
receiving a drop command to drop a user device from one of the at least three user devices from the conference call; and
removing the user device from the conference call in accordance with the drop command.

6. A method, comprising:
creating, by a conference call server, a conference call comprising at least three user devices, the at least three user devices being capable of participating in the conference call by providing audio inputs to the conference call server;
creating, by the conference call server, a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices;
implementing, by the conference call server, privacy control within the conference call by preventing at least one audio input corresponding to the first conference call group from being accessible to the second conference call group;
providing, by the conference call server, the at least three user devices graphical information comprising the first conference call group comprising the at least two of the at least three user devices, the second conference call group comprising the at least one of the at least three user devices, and the implemented privacy control within the conference call;
receiving a record command from a user device of the at least three user devices, the record command comprising identification information corresponding to the user device of the at least three user devices and an instruction to record an audio input of the user device of the at least three user devices;
identifying a user device within the conference call based on the identification information of the record command; and
recording the audio input of the identified user device.

7. The method of claim 6, wherein the creating of the conference call comprises:
receiving a create conference command from one of the at least three user devices;
designating the one of the at least three user devices as a host for the conference call; and
granting the one of the at least three user devices at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

8. A method, comprising:
creating, by a conference call server, a conference call comprising at least three user devices, the at least three user devices being capable of participating in the conference call by providing audio inputs to the conference call server;
creating, by the conference call server, a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices;
implementing, by the conference call server, privacy control within the conference call by preventing at least one audio input corresponding to the first conference call group from being accessible to the second conference call group;
providing, by the conference call server, the at least three user devices graphical information comprising the first conference call group comprising the at least two of the at least three user devices, the second conference call group comprising the at least one of the at least three user devices, and the implemented privacy control within the conference call;
receiving an outside call request from one of the at least three user devices, the outside call request comprising a request to establish a call between the one of the at least three user devices and a user device outside the conference call; and
connecting the one of the at least three user devices to establish a call between the one of the at least three user devices and the user device outside the conference call without having to leave the conference call and without permitting the user device outside the conference call to participate in the conference call.

9. The method of claim 8, wherein the creating of the conference call comprises:
receiving a create conference command from one of the at least three user devices;
designating the one of the at least three user devices as a host for the conference call; and
granting the one of the at least three user devices at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

10. A system comprising:
a conference call server, comprising:
a non-transitory memory device storing:
a plurality of processor-executable instructions; and
a processor configured to execute the processor-executable instructions, wherein executing the processor-executable instructions causes the processor to:
create a conference call comprising at least three user devices, the at least three user devices being capable of participating in the conference call by providing audio inputs to the conference call server, create a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices, implement privacy control within the conference call by preventing at least one audio input corresponding to the first conference call group from being accessible to the second conference call group, and provide the at least three user devices graphical information comprising the first conference call group comprising the at least two of the at least three user devices, the second conference call group comprising the at least one of the at least three user devices, and the implemented privacy control within the conference call;

receive a filter noise command from one of the at least three user devices, the filter noise command comprising identification information corresponding to a user device of the at least three user devices and an instruction to filter out background noise for the user device of the at least three user devices;

identify the user device of the at least three user devices based on the identification information of the filter noise command; and filter out background noise from an audio input of the identified user device within the conference call.

11. The system of claim 10, wherein executing the processor-executable instructions, to filter out background noise from the audio input of the identified user device, causes the processor to:

identify a voice of a user of the identified user device based on the audio input of the identified user device; and remove audio information from the audio input that does not correspond to the voice of the user of the identified user device.

12. The system of claim 10, wherein executing the processor-executable instructions, to create the conference call comprises, causes the processor to:

receive a create conference command from one of the at least three user devices; and designate the one of the at least three user devices as a host for the conference call; and grant the one of the at least three user devices at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

13. The system of claim 10, wherein executing the processor-executable instructions causes the processor to:

receive an add command to add a user device from one of the at least three user devices to the conference call; and add the user device to the conference call in accordance with the add command; and grant the user device at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

14. The system of claim 10, wherein executing the processor-executable instructions causes the processor to:

receive a drop command to drop a user device from one of the at least three user devices from the conference call; and remove the user device from the conference call in accordance with the drop command.

15. A system comprising:

a conference call server, comprising:

a non-transitory memory device storing:

a plurality of processor-executable instructions; and a processor configured to execute the processor-executable instructions, wherein executing the processor-executable instructions causes the processor to:

create a conference call comprising at least three user devices, the at least three user devices being capable of participating in the conference call by providing audio inputs to the conference call server, create a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices, implement privacy control within the conference call by preventing at least one audio input corresponding to the first conference call group from being accessible to the second conference call group, provide the at least three user devices graphical information comprising the first conference call group comprising the at least two of the at least three user devices, the second conference call group comprising the at least one of the at least three user devices, and the implemented privacy control within the conference call;

receive a record command from a user device of the at least three user devices, the record command comprising identification information corresponding to the user device of the at least three user devices and an instruction to record an audio input of the user device of the at least three user devices;

identify a user device within the conference call based on the identification information of the record command; and record the audio input of the identified user device.

16. The system of claim 15, wherein executing the processor-executable instructions, to create the conference call comprises, causes the processor to:

receive a create conference command from one of the at least three user devices; and designate the one of the at least three user devices as a host for the conference call; and grant the one of the at least three user devices at least one authorization regarding the conference call, the at least one authorization comprising at least one of an authorization to add user devices to the conference call, an authorization to drop user devices from the conference call, an ability to implement at least one privacy control for the conference call, an authorization to filter out background noise from the conference call, an authorization to record user devices within the conference call, and an authorization to receive an outside call without leaving the conference call.

17. A system comprising:
a conference call server, comprising:
 a non-transitory memory device storing:
  a plurality of processor-executable instructions; and
 a processor configured to execute the processor-executable instructions, wherein executing the processor-executable instructions causes the processor to:
  create a conference call comprising at least three user devices, the at least three user devices being capable of participating in the conference call by providing audio inputs to the conference call server,
  create a first conference call group and a second conference call group within the conference call, the first conference call group and the second conference call group each comprising a logical grouping of users that can participate in the conference call, the first conference call group comprising at least two of the at least three user devices and the second conference call group comprising at least one of the at least three user devices,
  implement privacy control within the conference call by preventing at least one audio input corresponding to the first conference call group from being accessible to the second conference call group,
  provide the at least three user devices graphical information comprising the first conference call group comprising the at least two of the at least three user devices, the second conference call group comprising the at least one of the at least three user devices, and the implemented privacy control within the conference call;
  receive an outside call request from one of the at least three user devices, the outside call request comprising a request to establish a call between the one of the at least three user devices and a user device outside the conference call; and
  connect the one of the at least three user devices to establish a call between the one of the at least three user devices and the user device outside the conference call without having to leave the conference call and without permitting the user device outside the conference call to participate in the conference call.

18. A method, comprising:
initiating, by a user device, a conference call by communicating a create conference request to a conference call server in response to receiving a request from a user of the user device to create the conference call;
adding, by the user device, other user devices to the conference call by communicating add commands for the other user devices to the conference call server in response to receiving a request from the user to add the other user devices to the conference call;
creating, by the user device, two or more conference call groups within the conference call by communicating create group commands to the conference call server in response to receiving a request from the user to create the two or more conference call groups within the conference call, the create group commands comprising information for associating the user device and each of the other user devices with at least one of the two or more conference call groups;
implementing, by the user device, a privacy control by communicating a privacy control command to the conference call server in response to receiving a request from the user to implement the privacy control within the conference call, the privacy control command comprising information for preventing an audio input of at least one of the user device and the other user devices from being received by another one of the at least one of the user device and the other user devices;
displaying, by the user device, graphical information representing the conference call, the user device, the other user devices, the at least two conference call groups, and the privacy control; and
recording one of the user device and the other user devices by communicating a record command to the conference call server in response to receiving a request from the user to record the one of the user device and the other user devices, the record command comprising identification information corresponding to the one of the user device and the other user devices.

19. The method of claim 18, further comprising:
filtering out background noise from the conference call by communicating a filter noise command to the conference call server in response to receiving a request from the user to filter out background noise, the filter noise command comprising identification information received from the user and corresponding to one of the user device and the other user devices.

20. A method, comprising:
initiating, by a user device, a conference call by communicating a create conference request to a conference call server in response to receiving a request from a user of the user device to create the conference call;
adding, by the user device, other user devices to the conference call by communicating add commands for the other user devices to the conference call server in response to receiving a request from the user to add the other user devices to the conference call;
creating, by the user device, two or more conference call groups within the conference call by communicating create group commands to the conference call server in response to receiving a request from the user to create the two or more conference call groups within the conference call, the create group commands comprising information for associating the user device and each of the other user devices with at least one of the two or more conference call groups;
implementing, by the user device, a privacy control by communicating a privacy control command to the conference call server in response to receiving a request from the user to implement the privacy control within the conference call, the privacy control command comprising information for preventing an audio input of at least one of the user device and the other user devices from being received by another one of the at least one of the user device and the other user devices;
displaying, by the user device, graphical information representing the conference call, the user device, the other user devices, the at least two conference call groups, and the privacy control; and connecting to an outside call by communicating an outside call request to the conference call server in response to receiving a request from a user to connect to the outside call, the outside call request comprising a request to establish a call between the user device and a user device outside the conference call without leaving the conference call and without permitting to the user device outside the conference call to participate in the conference call.

\* \* \* \* \*